United States Patent
Li et al.

(10) Patent No.: US 11,893,139 B2
(45) Date of Patent: Feb. 6, 2024

(54) METHOD FOR DISPLAYING BLOCKCHAIN DATA, BLOCKCHAIN BROWSER, USER NODE, AND MEDIUM

(71) Applicant: TENCENT TECHNOLOGY (SHENZHEN) COMPANY LIMITED, Guangdong (CN)

(72) Inventors: Maocai Li, Shenzhen (CN); Zongyou Wang, Shenzhen (CN); Kaiban Zhou, Shenzhen (CN); Jinsong Zhang, Shenzhen (CN); Hu Lan, Shenzhen (CN); Li Kong, Shenzhen (CN); Changqing Yang, Shenzhen (CN); Yifang Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 310 days.

(21) Appl. No.: 17/337,305

(22) Filed: Jun. 2, 2021

(65) Prior Publication Data

US 2021/0286900 A1    Sep. 16, 2021

Related U.S. Application Data

(63) Continuation of application No. PCT/CN2020/070681, filed on Jan. 7, 2020.

(30) Foreign Application Priority Data

Jan. 9, 2019    (CN) .................. 201910021197.X

(51) Int. Cl.
*G06F 21/64*    (2013.01)
*G06F 40/20*    (2020.01)
*G06F 21/60*    (2013.01)

(52) U.S. Cl.
CPC ............ *G06F 21/64* (2013.01); *G06F 21/602* (2013.01); *G06F 40/20* (2020.01)

(58) Field of Classification Search
CPC ........ G06F 21/64; G06F 21/602; G06F 40/20; G06F 21/6218; G06F 21/604
See application file for complete search history.

(56) References Cited

U.S. PATENT DOCUMENTS

2018/0025442 A1    1/2018 Isaacson et al.
2018/0131706 A1*   5/2018 Anderson ............... H04L 9/32
(Continued)

FOREIGN PATENT DOCUMENTS

CN    103544163    1/2014
CN    103678602    3/2014
(Continued)

OTHER PUBLICATIONS

Written Opinion dated Apr. 9, 2020 in International Application No. PCT/CN2020/070681 (4 pages).
(Continued)

*Primary Examiner* — Abiy Getachew
(74) *Attorney, Agent, or Firm* — ARENTFOX SCHIFF LLP

(57) ABSTRACT

Aspects of the disclosure provide a method for displaying blockchain data, a blockchain browser, a user node, and a medium. The method can include transmitting a blockchain data query request, and receiving blockchain data obtained through query in response to the blockchain data query request. Further, the method can include obtaining filtered blockchain data, the filtered blockchain data being generated after illegal content in the blockchain data is filtered out based on a filtering rule, and displaying the filtered block-
(Continued)

chain data. In embodiments of this disclosure, the display of the illegal content in the blockchain data can be automatically skipped.

19 Claims, 16 Drawing Sheets

(56) References Cited

U.S. PATENT DOCUMENTS

| | | | |
|---|---|---|---|
| 2019/0384842 A1* | 12/2019 | Rao | G06F 16/27 |
| 2021/0105142 A1* | 4/2021 | Lee | H04L 9/3247 |
| 2021/0167970 A1* | 6/2021 | Li | H04L 9/3239 |
| 2022/0038279 A1* | 2/2022 | Yang | H04L 9/32 |

FOREIGN PATENT DOCUMENTS

| | | |
|---|---|---|
| CN | 106528746 A | 3/2017 |
| CN | 107247773 A | 10/2017 |
| CN | 107463596 A | 12/2017 |
| CN | 108520464 A | 9/2018 |
| CN | 109167784 A | 1/2019 |
| CN | 109697367 | 4/2019 |

OTHER PUBLICATIONS

Chinese Office Action dated Jun. 3, 2021 in Application No. 201910021197.X with concise English translation, and AX therein. (10 pages).

Zhuang, "Research on Blockchain Investigation and Forensics—Take Bitcoin as an Example," Chinese Informatization, 2018 Edition, Issue 7, Jul. 10, 2018 (4 pages).

International Search Report dated Apr. 9, 2020 in International Application No. PCT/CN2020/070681, (6 pages).

* cited by examiner

METHOD FOR DISPLAYING BLOCKCHAIN DATA, BLOCKCHAIN BROWSER, USER NODE, AND MEDIUM

RELATED APPLICATION

This application is a continuation of International Application No. PCT/CN2020/070681, filed on Jan. 7, 2020, which claims priority to Chinese Patent Application No. 201910021197X, entitled "METHOD FOR DISPLAYING BLOCKCHAIN DATA, BLOCKCHAIN BROWSER, USER NODE, AND MEDIUM" and filed on Jan. 9, 2019. The entire disclosures of the prior applications are hereby incorporated by reference in their entirety.

FIELD OF THE TECHNOLOGY

This disclosure relates to the field of blockchains, including to a technology of displaying blockchain data.

BACKGROUND OF THE DISCLOSURE

Current blockchain browsers only display blockchain data obtained through query. Because the blockchain is tamper-proof, if someone uses the blockchain to spread illegal content, for example violence, pornography, or reactionary content, great challenges can be placed on the supervision of the blockchain.

SUMMARY

This disclosure provides a method for displaying blockchain data, a blockchain browser, a user node, and a medium, which can automatically skip displaying illegal content in the blockchain data.

According to an aspect of this disclosure, a method for displaying blockchain data is disclosed that is performed by a computing device. The method can include transmitting a blockchain data query request, and receiving blockchain data obtained through query in response to the blockchain data query request. The method can further include obtaining filtered blockchain data, the filtered blockchain data being generated after illegal content in the blockchain data is filtered out according to a filtering rule, and displaying the filtered blockchain data.

According to an aspect of the disclosure, a blockchain browser is disclosed that can include a blockchain data query request transmitting device that is configured to transmit a blockchain data query request, and a blockchain data receiving unit, configured to receive blockchain data obtained through query in response to the blockchain data query request. The blockchain browser can further include an obtaining device that is configured to obtain filtered blockchain data, the filtered blockchain data being generated after illegal content in the blockchain data is filtered out according to a filtering rule, and a display unit that is configured to display the filtered blockchain data.

According to an aspect of the disclosure, a user node is disclosed that can include a memory for storing computer-readable instructions, and a processor for reading the computer-readable instructions stored in the memory and performing the foregoing method.

According to an aspect of the disclosure, a computer program medium is disclosed for storing computer-readable instructions that, when executed by a processor of a computer, cause the computer to perform the foregoing method.

According to an aspect of the disclosure, a computer program product is disclosed including instructions that, when run on a computer, cause the computer to perform the foregoing method.

In the method for displaying blockchain data disclosed in the embodiments of this disclosure, the blockchain browser transmits a blockchain data query request, and receives blockchain data obtained through query in response to the blockchain data query request. Subsequently, the blockchain browser obtains filtered blockchain data, the filtered blockchain data being generated after illegal content in the blockchain data is filtered out according to a filtering rule, and finally displays the filtered blockchain data. In the foregoing method, after obtaining the blockchain data through query, the blockchain browser displays, to a user, the filtered blockchain data obtained after the illegal content is filtered out according to the filtering rule instead of directly displaying the blockchain data to the user. Therefore, the display of the illegal content in the blockchain data can be automatically skipped, and the security of blockchain supervision is improved.

Other features and advantages of this disclosure become obvious through the following detailed descriptions. Further, it is to be understood that the foregoing general descriptions and the following detailed descriptions are only exemplary, and cannot limit this disclosure.

BRIEF DESCRIPTION OF THE DRAWINGS

The above and other objectives, features, and advantages of this disclosure will become more apparent from the detailed description of exemplary embodiments of this disclosure with reference to the accompanying drawings.

DESCRIPTION OF EMBODIMENTS

Exemplary implementations are described more comprehensively with reference to the accompanying drawings. However, the exemplary implementations can be implemented in various forms, and it is not to be understood as being limited to the examples described herein. On the contrary, the exemplary implementations are provided to make the descriptions of this disclosure more comprehensive and complete, and comprehensively convey the idea of the exemplary implementations to a person skilled in the art. The accompanying drawings are merely exemplary illustrations of this disclosure and are not necessarily drawn to scale. The same reference numbers in the accompanying drawings represent the same or similar parts, and therefore, repeated descriptions thereof are omitted.

In addition, the described features, structures, or characteristics may be combined in one or more exemplary implementations in any appropriate manner. In the following description, many specific details are provided to give a full understanding of the exemplary implementations of this disclosure. However, a person skilled in the art is to be aware that, the technical solutions in this disclosure may be implemented without one or more of the particular details, or another method, unit, or step may be used. In other cases, well-known structures, methods, implementations, or operations are not shown or described in detail, in order not to obscure the aspects of this disclosure.

Some of the block diagrams shown in the accompanying drawings are functional entities and do not necessarily correspond to physically or logically independent entities. Such functional entities may be implemented in the form of software, or implemented in one or more hardware modules or integrated circuits, or implemented in different networks and/or processor apparatuses and/or micro-controller apparatuses.

A system architecture and an overall process to which an embodiment of this disclosure is applied are first described below with reference to FIG. 1a to FIG. 1c.

Figure 1A:
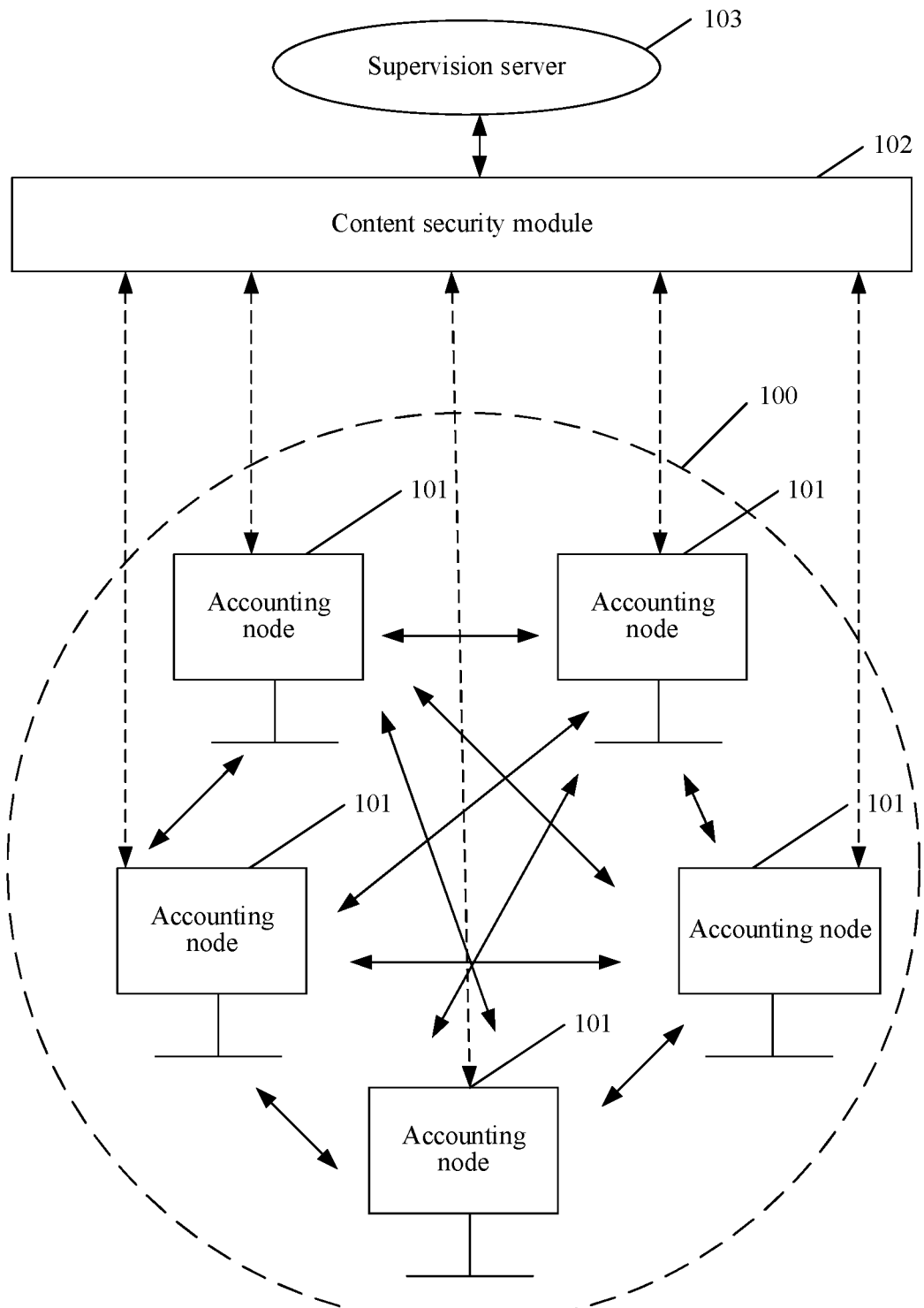
FIG. 1a is a system architecture diagram of a method for displaying blockchain data according to an embodiment of this disclosure.

FIG. 1a shows a system architecture to which a method for displaying blockchain data is applied according to an embodiment of this disclosure. The system architecture includes a group of accounting nodes 100, a content security module or device 102, and a supervision server 103. The group of accounting nodes 100 includes a plurality of accounting nodes 101. Each accounting node 101 is a node generating to-be-chained transaction information, a node chaining the transaction information and a leader accounting node generated through selection may encapsulate and chain the transaction information, and a node querying for chained transaction information. The content security module 102 is configured to filter out illegal content, for example pornography or violence, in blockchain data before a blockchain browser on the accounting node 101 displays the blockchain data. The supervision server 103 is a server supervising whether content displayed in the entire system architecture is healthy.

When an accounting node 101 is to query for blockchain data, which may be a piece of transaction information, or may be a data block including a plurality of pieces of transaction information, a chain is queried. Because blockchain data is generally encoded and stored on a blockchain, corresponding blockchain data is generally decoded first after obtained through query. The accounting node 101 has a blockchain browser installed. The decoded blockchain data is not directly displayed on the blockchain browser, but is transmitted to the content security module 102. After filtering out illegal content according to a filtering rule, the content security module 102 returns filtered blockchain data to the blockchain browser of the accounting node 101 for display. The filtering rule in the content security module 102 is set and updated by the supervision server 103, for example, updated regularly.

Figure 1B:
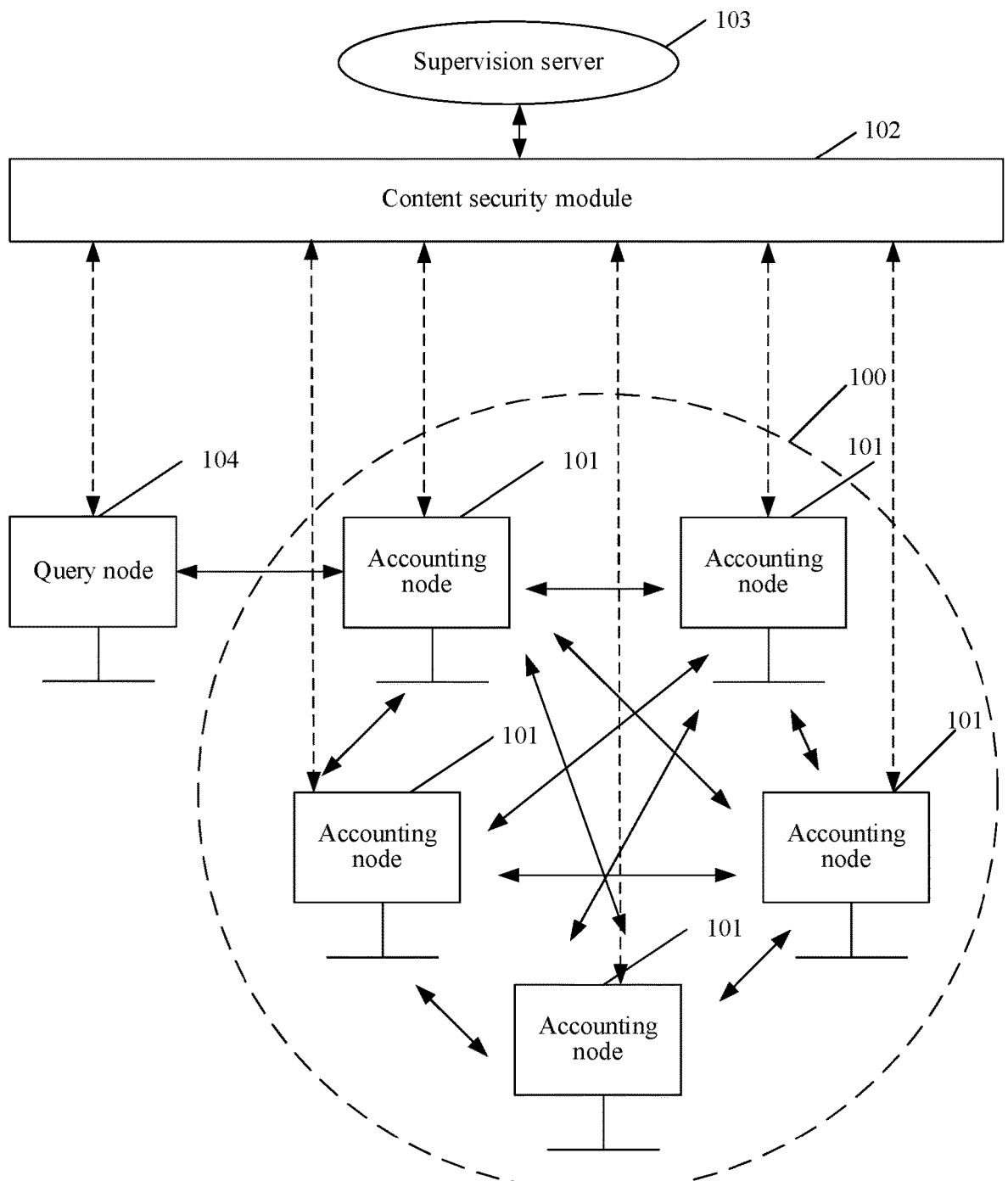
FIG. 1b is a system architecture diagram of a method for displaying blockchain data according to an embodiment of this disclosure.

FIG. 1b shows another system architecture to which a method for displaying blockchain data is applied according to an embodiment of this disclosure. The difference between this system architecture and the system architecture in FIG. 1a is that this system architecture further includes a query node 104 outside the group of accounting nodes 100. In this system architecture, the query node 104 is a node generating to-be-chained transaction information, and a node querying for chained transaction information. The accounting node 101 usually neither generates to-be-chained transaction information, nor queries for chained transaction information, and functions only to chain transaction information. Certainly, the accounting node 101 is also allowed to generate to-be-chained transaction information, and query for chained transaction information. Each query node 104 usually corresponds to a fixed accounting node 101. When the query node 104 is to chain transaction information, the query node 104 transmits the transaction information to the corresponding accounting node 101 for chaining. When needing to query for chained transaction information, the query node entrusts the corresponding accounting node 101 with the query.

In FIG. 1b, when querying for blockchain data, the query node 104 entrusts the corresponding accounting node 101 with the query, and receives encoded blockchain data returned by the corresponding accounting node 101. The query node 104 has a blockchain browser in the embodiments of this disclosure installed. After the encoded blockchain data is decoded, the decoded blockchain data is not directly displayed on the blockchain browser, but is transmitted to the content security module 102. After filtering out illegal content according to the filtering rule, the content security module 102 returns the filtered blockchain data to the blockchain browser of the query node 104 for display. Certainly, the accounting node 101 may also have a blockchain browser installed, which performs a similar process during displaying blockchain data obtained through query.

Figure 1C:
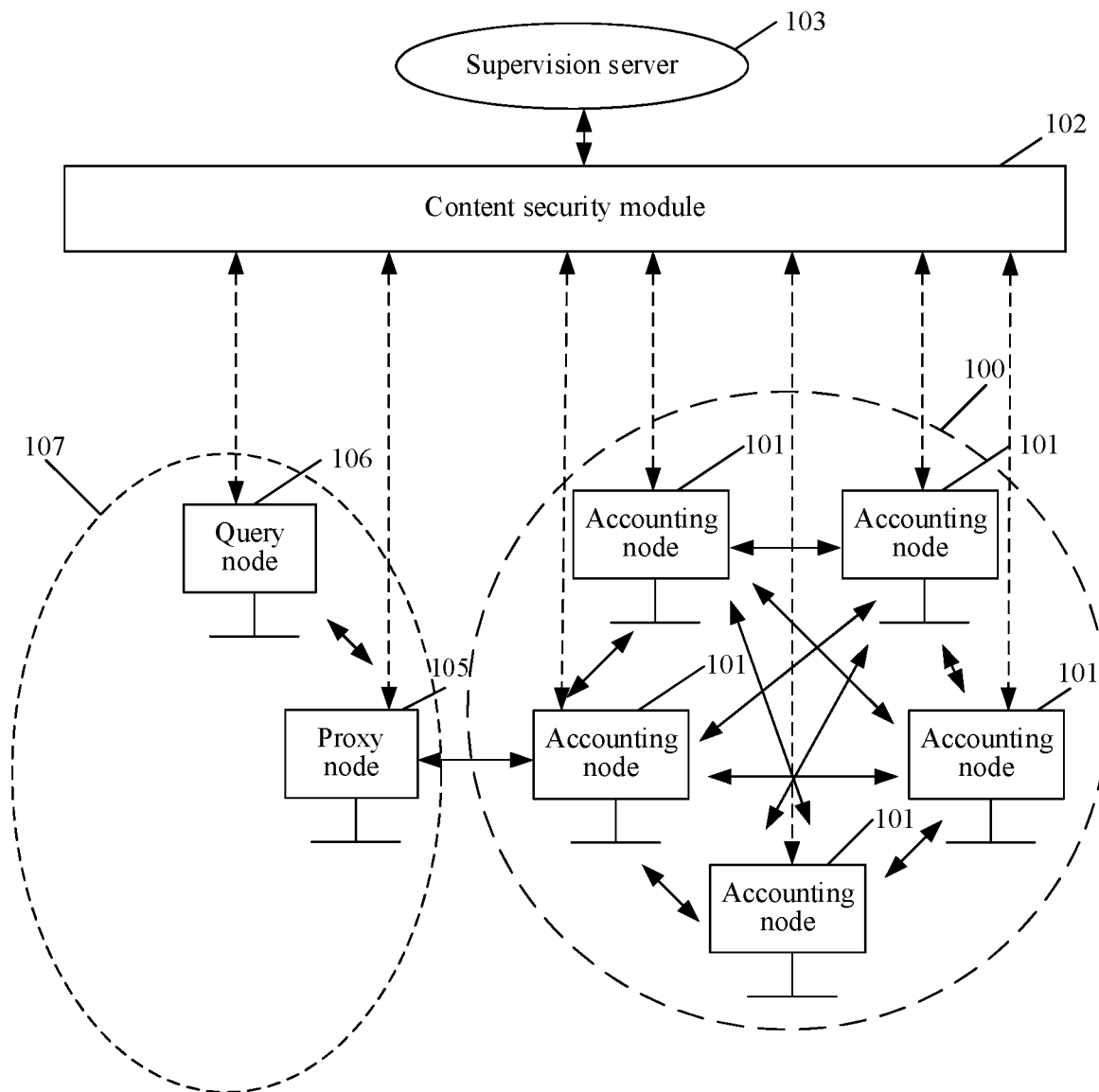
FIG. 1c is a system architecture diagram of a method for displaying blockchain data according to an embodiment of this disclosure.

FIG. 1c shows another system architecture to which a method for displaying blockchain data is applied according to an embodiment of this disclosure. The difference between the architecture in FIG. 1c and the system architecture in FIG. 1a is that in addition to the group of accounting nodes 100, the system architecture in FIG. 1c further includes a group of attestation nodes 107. The group of attestation nodes 107 includes a query node 106. The query node 104 in FIG. 1b can only passively trust accounting of the accounting nodes 101, but the query node 106 in the group of attestation nodes 107 in FIG. 1c can verify the accounting of the accounting nodes 101, to prevent all the accounting nodes 101 from cheating during accounting.

A proxy node 105 is a special node in the group of attestation nodes 107, and is an interface between the attestation nodes 107 and the accounting nodes 101. When the query node 106 is to chain transaction information, the query node 106 transmits corresponding transaction information to the accounting node 101 by using the proxy node 105, and the accounting node 101 chains the transaction information. After the chaining, the accounting node 101 returns a block header of a chained data block to the query node 106 by using the proxy node 105. The block header includes a digest of the data block and a signature obtained by encrypting the digest by the accounting node 101 by using a private key of the accounting node 101. The query node 106 decrypts the signature by using a public key of the accounting node 101, and compares a result of the decryption with the digest in the block header, to verify the signature and prevent all the accounting nodes 101 from cheating during accounting.

When needing to query for blockchain data, the query node 106 transmits a blockchain data query request to the accounting node 101 by using the proxy node 105, and the accounting node 101 transmits encoded blockchain data to the query node 106. After decoding the encoded blockchain data, the query node 106 does not directly display the decoded blockchain data on a blockchain browser, but transmits the decoded blockchain data to the content security module 102. After filtering out illegal content according to the filtering rule, the content security module 102 returns filtered blockchain data to the blockchain browser of the query node 106 for display. Certainly, the accounting node 101 may also have a blockchain browser installed, which performs a similar process during displaying the blockchain data obtained through query.

Specific interfaces in an application scenario of electronic invoice query to which a method for displaying blockchain data according to an embodiment of this disclosure is applied are described below with reference to interface diagrams in FIG. 2a to FIG. 2c and FIG. 3a to FIG. 3c.

Figure 2A:
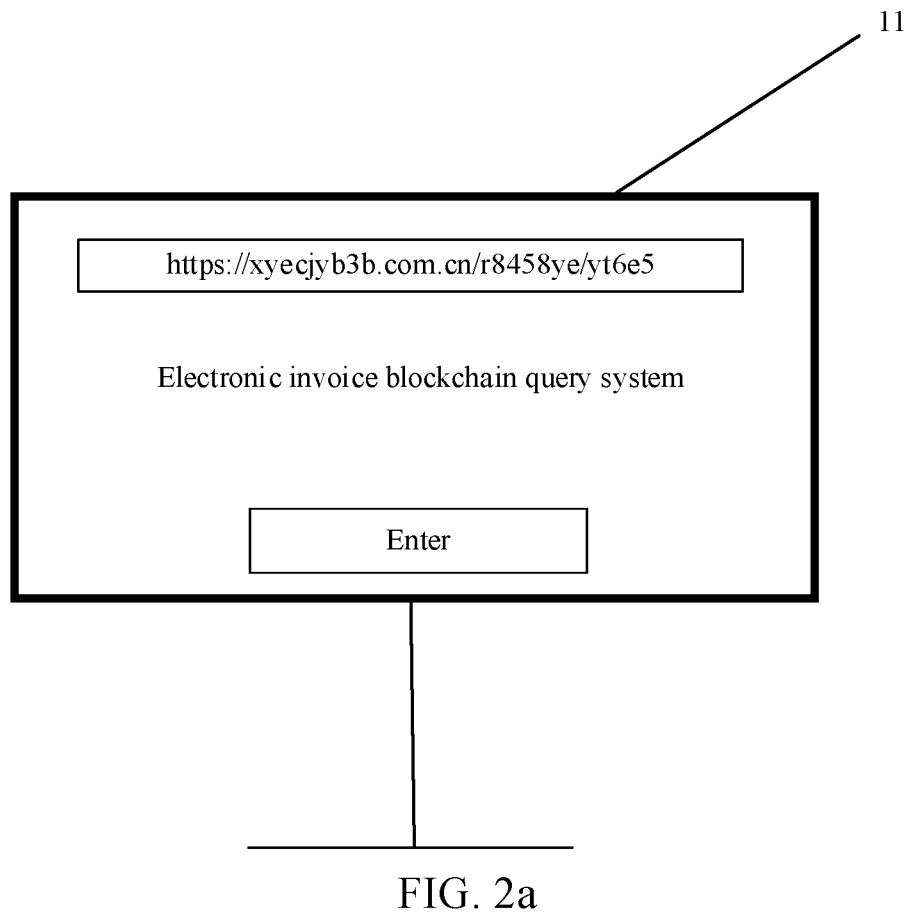
FIG. 2a is a schematic interface diagram of an application scenario in which a method for displaying blockchain data is applied to a web electronic invoice blockchain query system according to an embodiment of this disclosure.
Figure 2B:
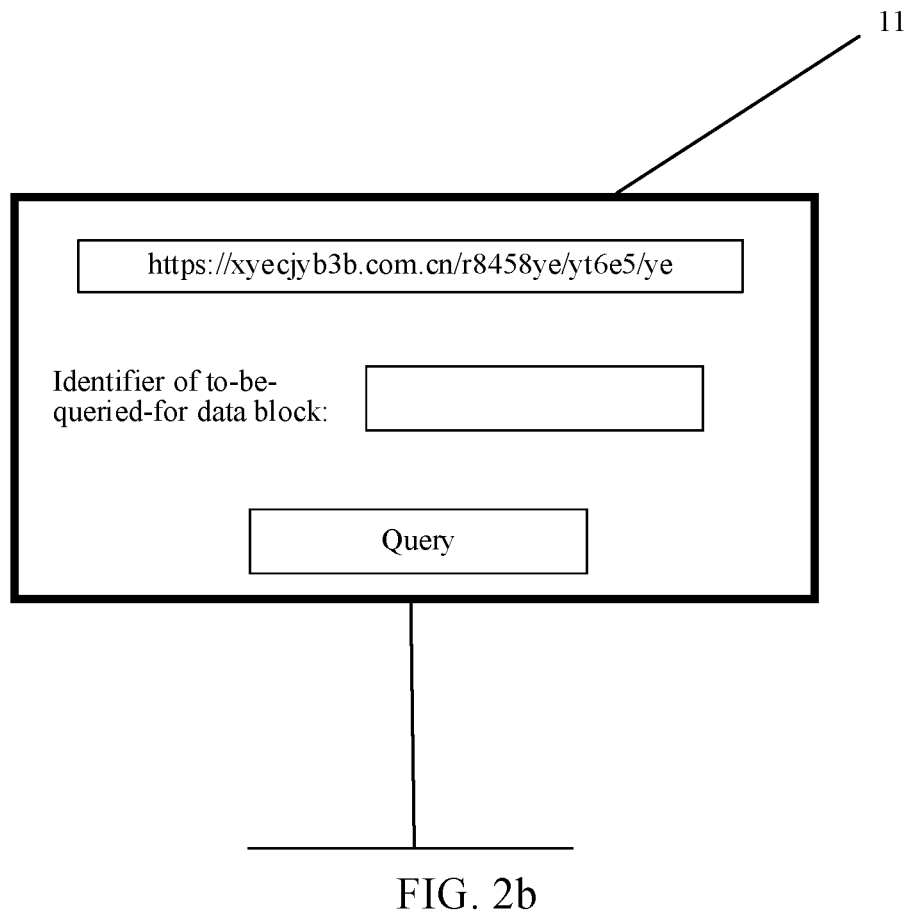
FIG. 2b is a schematic interface diagram of an application scenario in which a method for displaying blockchain data is applied to a web electronic invoice blockchain query system according to an embodiment of this disclosure.
Figure 2C:
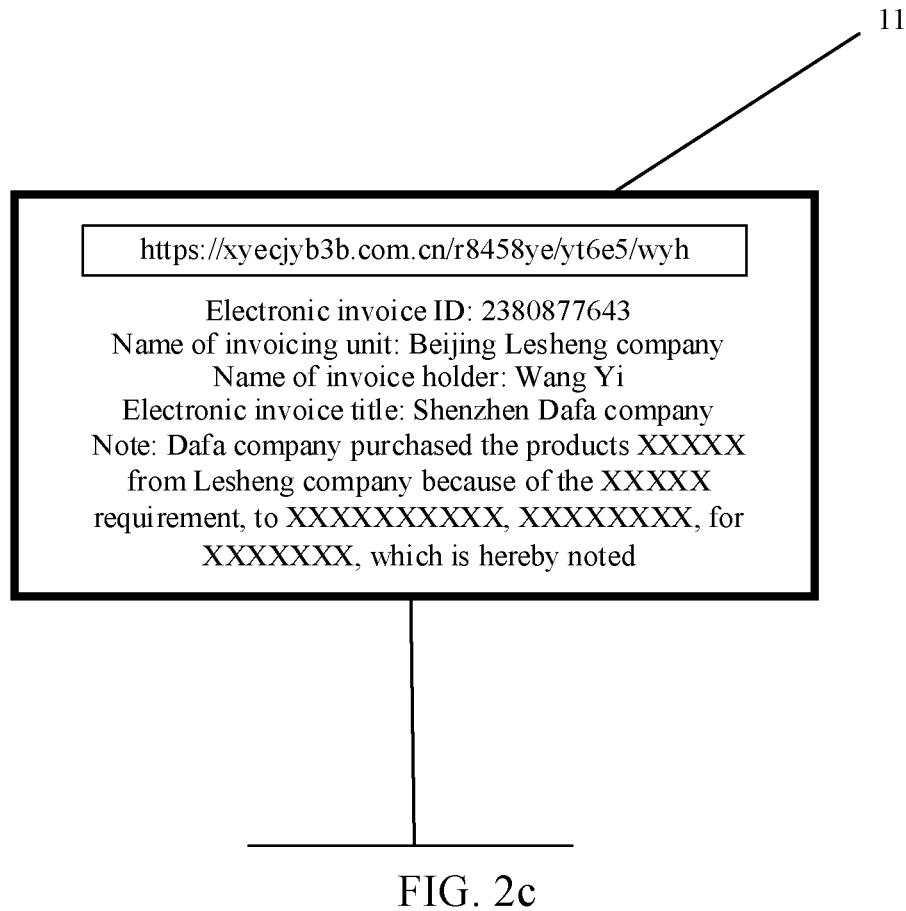
FIG. 2c is a schematic interface diagram of an application scenario in which a method for displaying blockchain data is applied to a web electronic invoice blockchain query system according to an embodiment of this disclosure.

FIG. 2a to FIG. 2c show a specific interface displayed on a web electronic invoice blockchain browser.

As shown in FIG. 2a, when needing to query for electronic invoice blockchain data by using the accounting node 101 shown in FIG. 1a, the query node 104 shown in FIG. 1b, or the query node 106 shown in FIG. 1c, a user enters a web address of the electronic invoice blockchain browser in an Internet browser. A home page of the web electronic invoice blockchain browser is displayed on the interface.

The user taps/clicks "Enter" on the interface in FIG. 2a, and enters an interface for entering an identifier, for example a digest or a height, of a to-be-queried-for electronic invoice data block, as shown in FIG. 2b. If the user enters the identifier of the to-be-queried-for electronic invoice data block in a text box on the interface shown in FIG. 2b, and taps/clicks "Query", specific transaction information of an electronic invoice data block corresponding to the data block identifier is displayed, as shown in FIG. 2c.

In the interface in FIG. 2c, the transaction information of the electronic invoice data block is listed. In "Note", some sensitive words or sentences are skipped, that is, displayed in the form of XXXXX. The sensitive words or sentences are illegal content, for example pornography or violence. Before presentation to the user, the electronic invoice blockchain browser transmits to-be-presented content to the content security module. After the content security module filters out the illegal content, the electronic invoice blockchain browser represents the content.

Figure 3A:
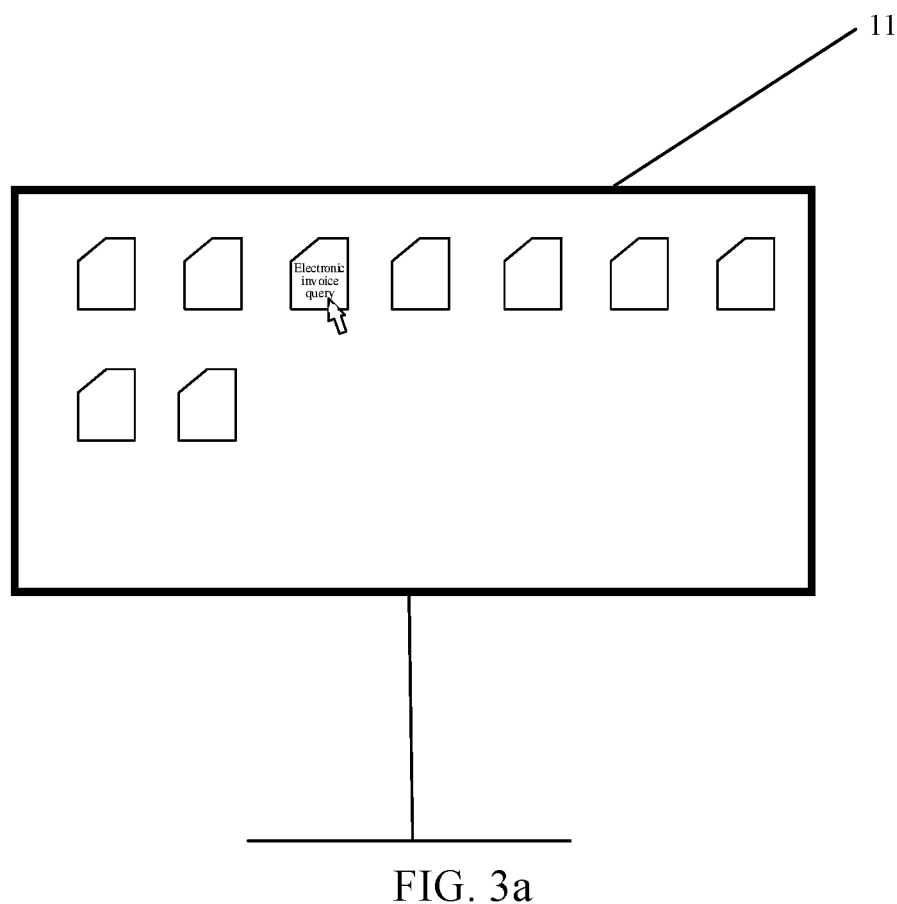
FIG. 3a is a schematic interface diagram of an application scenario in which a method for displaying blockchain data is applied to an electronic invoice blockchain query system application (APP) according to an embodiment of this disclosure.
Figure 3B:
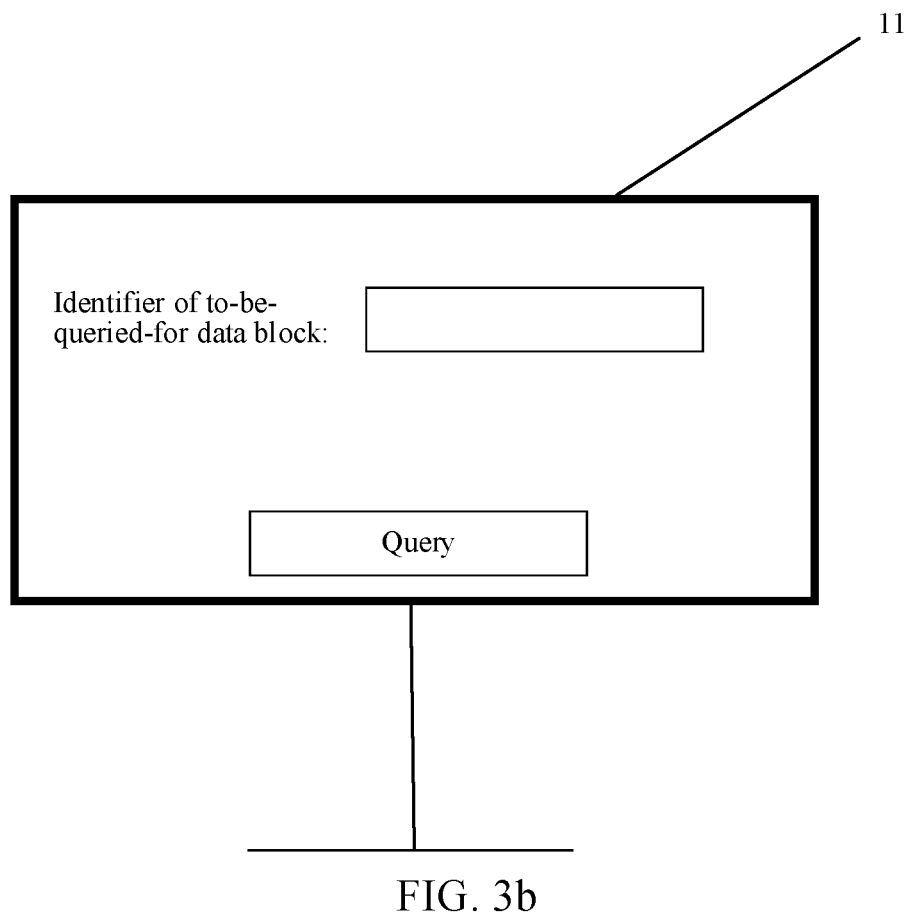
FIG. 3b is a schematic interface diagram of an application scenario in which a method for displaying blockchain data is applied to an electronic invoice blockchain query system APP according to an embodiment of this disclosure.
Figure 3C:
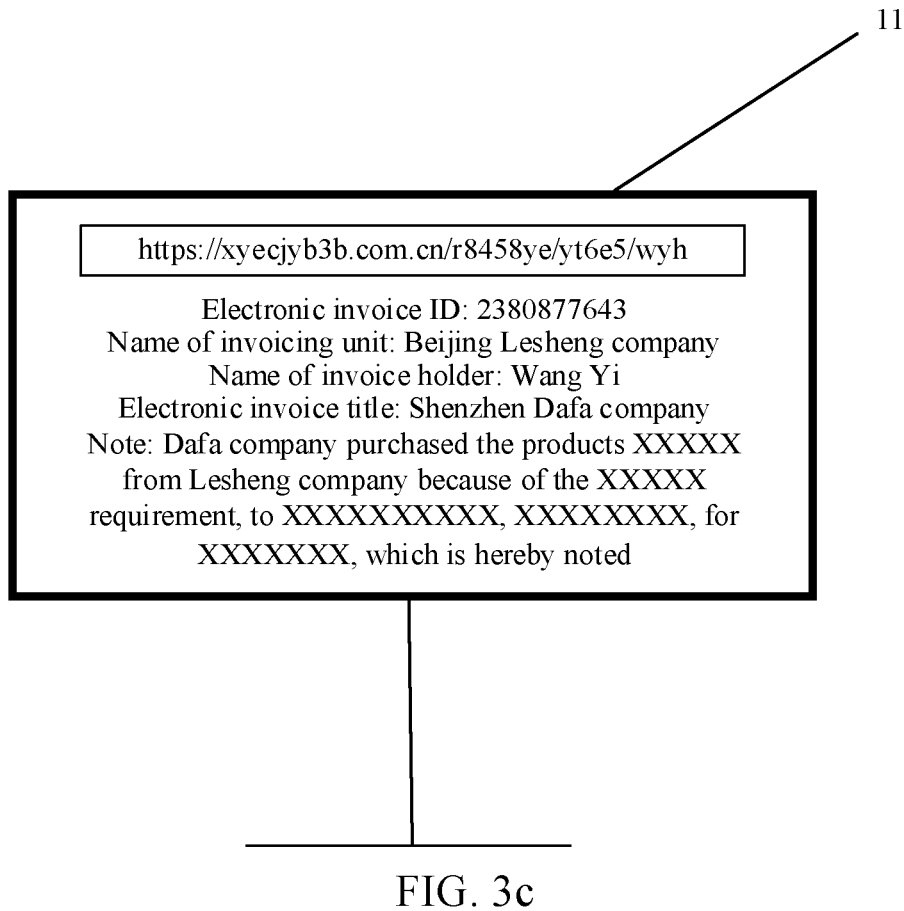
FIG. 3c is a schematic interface diagram of an application scenario in which a method for displaying blockchain data is applied to an electronic invoice blockchain query system APP according to an embodiment of this disclosure.

FIG. 3a to FIG. 3c show a specific interface displayed on an electronic invoice blockchain browser APP.

As shown in FIG. 3a, when needing to query for electronic invoice blockchain data by using the accounting node 101 shown in FIG. 1a, the query node 104 shown in FIG. 1b, or the query node 106 shown in FIG. 1c, a user selects a corresponding electronic invoice query blockchain browser APP on a desktop.

After the APP is opened, a blockchain browser runs, displays an interface shown in FIG. 3b, and requires the user to enter an identifier, for example a digest or a height of a to-be-queried-for electronic invoice data block. If the user enters the identifier of the to-be-queried-for electronic invoice data block on the interface shown in FIG. 3b, and taps/clicks "Query", specific transaction information of an electronic invoice data block corresponding to the data block identifier is displayed, as shown in FIG. 3c.

The interface in FIG. 3c is similar to that in FIG. 2c, where some illegal content is skipped, that is, displayed in the form of XXXXXX.

It can be seen from the interfaces in FIG. 2a to FIG. 2c and FIG. 3a to FIG. 3c that the illegal content is skipped before presented to the user, which improves the security of blockchain supervision.

Figure 4:
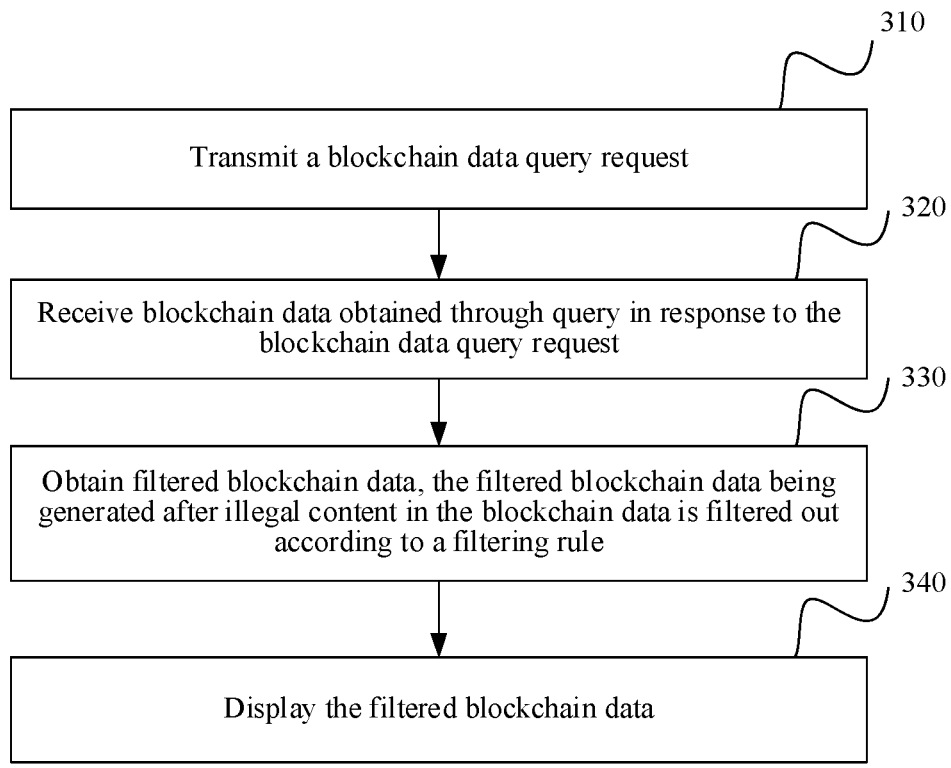
FIG. 4 is a flowchart of a method for displaying blockchain data according to an embodiment of this disclosure.

FIG. 4 shows a method for displaying blockchain data according to an embodiment of this disclosure. The method may be performed by a blockchain browser installed on any node. For example, the method may be performed by a blockchain browser installed on the accounting node 101 shown in FIG. 1a, the query node 104 shown in FIG. 1b, or the query node 106 shown in FIG. 1c. In some cases, the method may alternatively be performed by a blockchain browser installed on the accounting node 101 shown in FIG. 1b, the accounting node 101 shown in FIG. 1c, or the like.

Blockchain data is data stored on a blockchain. The blockchain data may be a complete data block on the blockchain, or may be transaction information in the data block.

As shown in FIG. 4, the method includes the following steps.

In Step 310, the method can transmit a blockchain data query request.

In Step 320, the method can receive blockchain data obtained through query in response to the blockchain data query request.

In Step 330, the method can obtain filtered blockchain data, the filtered blockchain data being generated after illegal content in the blockchain data is filtered out according to a filtering rule.

In Step 340, the method can display the filtered blockchain data.

The foregoing steps are described below in detail.

In step 310, a blockchain data query request is transmitted. The blockchain data query request is a request for querying blockchain data. In the system architecture in FIG. 1a, the request is triggered by selecting "Query" on the interface in FIG. 2b or FIG. 3b when an administrator at the accounting node 101 intends to query for blockchain data. In the system architecture in FIG. 1b, the request is transmitted, after a user at the query node 104 selects "Query" on the interface in FIG. 2b or FIG. 3b, by the query node 104 to the accounting node 101 when the user intends to query for blockchain data. In the system architecture in FIG. 1c, the request is transmitted, after a user at the query node 106 selects "Query" on the interface in FIG. 2b or FIG. 3b, by the query node 106 by using the proxy node 105 to the accounting node 101 when the user intends to query blockchain data in a block body.

When the blockchain data is the entire data block, the blockchain data query request may include an identifier of the data block. The identifier may be a digest of the data block, or may be a height of the data block on the blockchain. During query, because an identifier (a digest, a height, or the like) of a data block is written in a block header of a chained data block, a corresponding data block may be found by matching the identifier of the block header of the data block against the identifier of the data block in the blockchain data query request.

When the blockchain data is one or more pieces of transaction information in the data block, the blockchain data query request may include an identifier of the data block where the transaction information is located and an identifier of the transaction information. The identifier of the transaction information may be a digest of the transaction information. When the block body of the data block is generated, the identifier of the transaction information and the transaction information are correspondingly stored in the block body. Therefore, the corresponding data block on the blockchain may be found according to the identifier of the data block in the blockchain data query request, and then corresponding transaction information may be found in the data block according to the identifier of the transaction information in the blockchain data query request.

In step 320, blockchain data obtained through query in response to the blockchain data query request is received. After the blockchain data is obtained through query, the accounting node 101 shown in FIG. 1a receives the blockchain data obtained through query by a chain query module of the accounting node 101, the query node 104 shown in FIG. 1b receives the blockchain data obtained through query and transmitted by the accounting node 101, or the query node 106 shown in FIG. 1c receives the blockchain data forwarded by the proxy node 105 from the accounting node 101.

In an embodiment, the blockchain data may be stored on the blockchain after encoded. Therefore, in an embodiment, step 320 includes: receiving encoded blockchain data obtained through query in response to the blockchain data query request. After step 320, the method includes: decoding the encoded blockchain data. The encoding storage manner has the following beneficial effect: A leakage of information on the blockchain may be prevented. Even though the blockchain data on the blockchain is exposed to a third party, because what is exposed is the encoded blockchain data, a risk of the leakage of information is greatly reduced.

In step 330, filtered blockchain data is obtained, the filtered blockchain data being generated after illegal content in the blockchain data is filtered out according to a filtering rule. The illegal content is content that does not meet a predetermined filtering rule. If the filtering rule is to filter out all content related to pornography, the illegal content is all content related to pornography. The filtered blockchain data is blockchain data obtained after the illegal content is filtered out.

Figure 5:
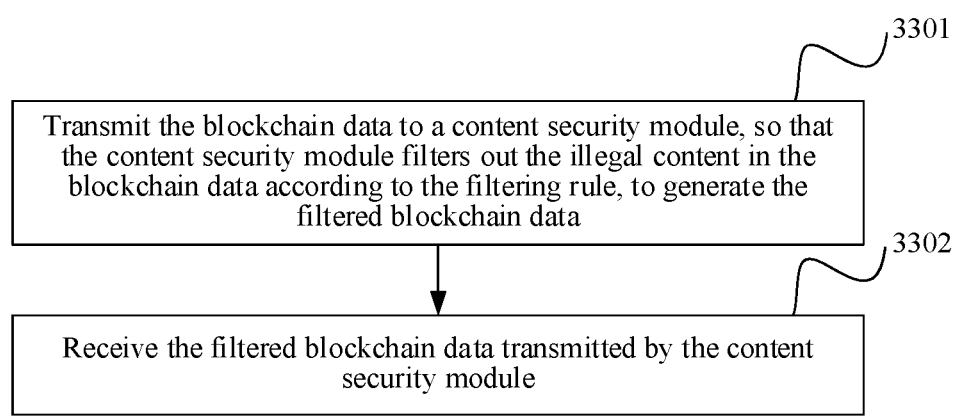
FIG. 5 is a specific flowchart of obtaining filtered blockchain data according to an embodiment of this disclosure.

In an embodiment, as shown in FIG. 5, step 330 includes the following steps.

In Step 3301, the method can further include transmitting the blockchain data to a content security module, so that the content security module filters out the illegal content in the blockchain data according to the filtering rule, to generate the filtered blockchain data.

In Step 3302, the method can further include receiving the filtered blockchain data transmitted by the content security module. The content security module is configured to filter out illegal content, for example pornography or violence, before a blockchain browser displays blockchain data. The content security module may be a security server deployed outside a terminal, that is, a terminal has the blockchain browser installed, configured to display blockchain data. As shown in FIG. 1a to FIG. 1c, the content security module may alternatively be a module that is deployed in the terminal configured to display blockchain data, but is outside the blockchain browser, for example, a module in each accounting node 101 in FIG. 1a, a module in the query node 104 in FIG. 1b, or a module in the query node 106 in FIG. 1c. When the content security module is a module in the terminal configured to display blockchain data, such modules in terminals may be the same.

In the foregoing embodiment, the content security module outside the blockchain browser filters out the illegal content. However, in another embodiment, the blockchain browser has a filtering function. The blockchain browser may generate the filtered blockchain data after filtering out the illegal content in the blockchain data according to the filtering rule.

The filtering rule is a rule for filtering out the illegal content in the blockchain data.

When the content security module 102 is the security server deployed outside the terminal configured to display blockchain data (as shown in FIG. 1a to FIG. 1c), the filtering rule in the security server is set and updated by the supervision server 103. Once the filtering rule in the security server is set, the filtering rule may be updated regularly or irregularly. The irregular updating means that once the filtering rule is updated, the update is immediately reflected in the filtering rule stored on the security server. The regular updating means that after the filtering rule is changed, the change is not immediately reflected in the stored filtering rule, but is reflected in the stored filtering rule at a regular interval.

In an embodiment of the irregular updating, the filtering rule is updated by receiving an updated filtering rule transmitted by the supervision server in response to an update of the filtering rule, and storing the received updated filtering rule.

In this embodiment, the supervision server detects the update of the filtering rule, for example, a new filtering rule manually entered by an administrator, and transmits the filtering rule to the content security module, so that the content security module can update the stored filtering rule in real time. The real-time updating has the following beneficial effect: The filtering rule can reflect a real-time change, to improve the consistency of a filtering effect with a real-time requirement.

In an embodiment of the regular updating, the regular updating may include active regular updating and passive regular updating.

In an embodiment of the active regular updating, the filtering rule is updated by regularly transmitting a request for an updated filtering rule to the supervision server, and receiving and storing the updated filtering rule transmitted by the supervision server. That is, within a period, after detecting an update of the filtering rule, the supervision server does not immediately transmit the updated filtering rule to the content security module, but waits for a regular request of the content security module. The content security module transmits a request for an updated filtering rule to the supervision server at a predetermined time interval, for example 5s, to request an updated filtering rule generated within this period. After receiving the request, the supervision server transmits all updated filtering rules received within the period to the content security module.

In an embodiment of the passive regular updating, the filtering rule is updated by receiving and storing an updated filtering rule that is periodically transmitted by the supervision server and generated within a current period. That is, after detecting an update of the filtering rule within the current period, the supervision server waits for the end of the current period. Once the current period ends, the supervision server transmits all updated filtering rules received within the current period to the content security module.

In the embodiments, the regular updating has the following beneficial effect: An updated filtering rule is not transmitted once the updated filtering rule is detected, but is accumulated until the end of the current period. In this way, the transmission load of a network can be reduced and the congestion of network transmission can be avoided.

When the content security module is deployed in the terminal configured to display blockchain data, or when the blockchain browser has the filtering function, the filtering rule in the content security module or the blockchain browser is set and updated by the supervision server. A method of updating the filtering rule is similar to the foregoing method. Therefore, details are not described herein again.

The filtering rule may not be fixed, but is related to a type of a user node initiating the blockchain data query request. For example, when the user node is a processing terminal of the public security system for eliminating pornography and illegal publication, the user node records some pornographic sentences on the blockchain to record an actual scene. Therefore, some pornographic words that appear may not be considered as illegal content. In a terminal of a duty-free zone, it is also normal for some words "Do not pay tax" to appear, which are not considered as illegal content. Therefore, a corresponding filtering rule may be set according to a type of a user node.

The user node is a terminal transmitting a blockchain data query request, for example, the accounting node 101 in FIG. 1a, the query node 104 in FIG. 1b, or the query node 106 in FIG. 1c. The user node type is classification on the user node according to a service processed by the user node. For example, a type of a public security terminal for elimination of pornography and illegal publication may be "eliminating pornography and illegal publication", and a type of a terminal engaged in commodity sales may be "sales". A table of a correspondence between a user node type and a filtering rule may be preset in the content security module or the blockchain browser.

In the embodiment in which the content security module implements filtering, the transmitting the blockchain data to a content security module includes: transmitting the blockchain data together with a user node type to the content security module. The user node type exists in a user node where the blockchain browser is located, and may be obtained from the user node where the blockchain browser is located. Then, the blockchain data may be encapsulated into a message with the user node type added to a header of the message, and transmitted to the content security module.

In the embodiment in which the blockchain browser has the filtering function, the user node type may be obtained from the user node where the blockchain browser is located.

Figure 6:
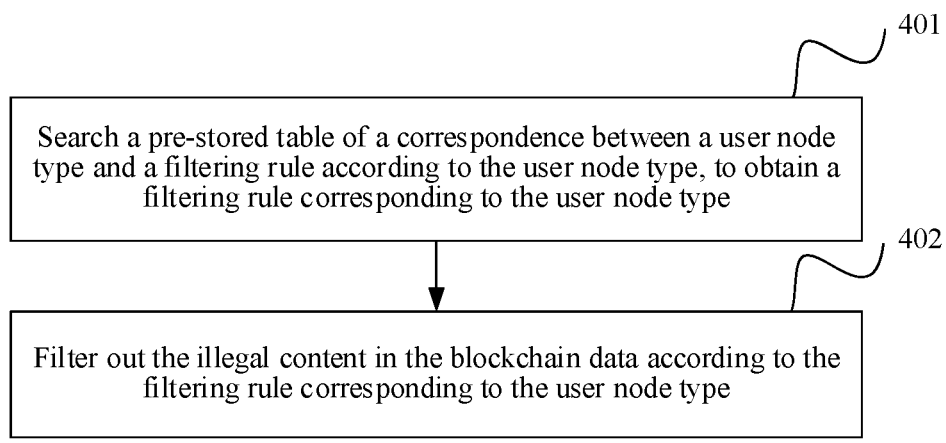
FIG. 6 is a specific flowchart of filtering out illegal content in blockchain data according to a filtering rule according to an embodiment of this disclosure.

As shown in FIG. 6, in either the embodiment in which the content security module performs the filtering, or the embodiment in which the blockchain browser performs the filtering, the filtering out the illegal content in the blockchain data according to the filtering rule may include the following steps.

In Step 401, the filtering can include searching a pre-stored table of a correspondence between a user node type and a filtering rule according to the user node type, to obtain a filtering rule corresponding to the user node type.

In Step 402, the process can include filtering out the illegal content in the blockchain data according to the filtering rule corresponding to the user node type. When the user node type is added to the header of the message and transmitted to the content security module, the user node type may be read from the header of the message, the pre-stored table of a correspondence between a user node type and a filtering rule may be searched to obtain the filtering rule corresponding to the user node type, and the illegal content is filtered out according to the filtering rule.

This embodiment has the beneficial effects. For example, the pertinence and the effect of filtering are improved since filtering rules better meet actual statuses of different types of user nodes.

The blockchain may include a plurality of sub-blockchains. The sub-blockchains are sub-chains forming the blockchain. A block header of a data block on each sub-chain records a digest of a previous data block on the sub-blockchain, so that data blocks on the sub-chain are in association with each other. Each sub-blockchain may be accounted by a different accounting node, and transaction information recorded on different sub-blockchains may have different attributes. For example, a sub-blockchain records a data block for an electronic invoice, and a sub-blockchain records a data block of a hospital diagnosis. On the sub-blockchain recording information about the electronic invoice, some physiological names of the human body that appear may be considered as pornographic, and on the sub-blockchain recording the hospital diagnosis, some physiological terms that appear may be considered as normal. Therefore, in an embodiment, different filtering rules are set according to different sub-blockchains. In this embodiment, the blockchain includes a plurality of sub-blockchains, and each sub-blockchain has a sub-blockchain identifier. The sub-blockchain identifier is a number of a sub-blockchain or another symbol that can distinguish different sub-blockchains.

In the embodiment in which the content security module implements the filtering, the transmitting the blockchain data to a content security module includes: transmitting the blockchain data together with a sub-blockchain identifier of a sub-blockchain where the blockchain data is located to the content security module. As described above, the sub-blockchain identifier may also be transmitted in a form of being placed in a header of a message. Therefore, details are not described.

In the embodiment in which the blockchain browser has the filtering function, the sub-blockchain identifier is entered when the user queries for the blockchain data. In addition, the blockchain data query request also has the sub-blockchain identifier, and the sub-blockchain identifier may alternatively be obtained from the blockchain data query request.

Figure 7:
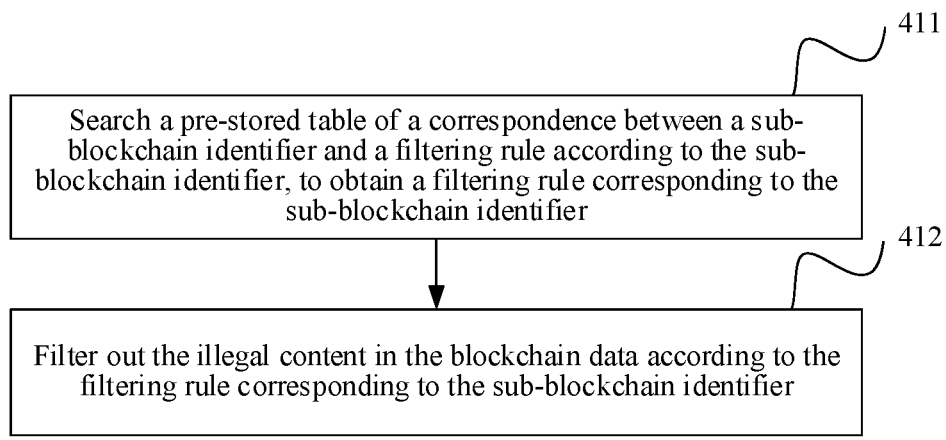
FIG. 7 is a specific flowchart of filtering out illegal content in blockchain data according to a filtering rule according to an embodiment of this disclosure.

As shown in FIG. 7, no matter whether the filtering is performed by the content security module or the blockchain browser, the filtering out the illegal content in the blockchain data according to the filtering rule includes the following steps.

In Step 411, the process can include searching a pre-stored table of a correspondence between a sub-blockchain identifier and a filtering rule according to the sub-blockchain identifier, to obtain a filtering rule corresponding to the sub-blockchain identifier.

In Step 412, the process can filter out the illegal content in the blockchain data according to the filtering rule corresponding to the sub-blockchain identifier.

The foregoing process is similar to steps 401 and 402 in FIG. 6, except that the user node type is replaced with the sub-blockchain identifier. Therefore, details are not described again. The foregoing embodiments have beneficial effects. For example, it is fully considered that data blocks recorded by the same sub-blockchain have some commonalities, and data blocks recorded by different sub-blockchains may have some differences, so that a corresponding filtering rule is determined based on the sub-blockchain identifier, to improve the pertinence and the effect of filtering.

The filtering rule may be represented as an illegal word list, an illegal sentence list, or the like, or may be represented in a non-list form, for example a total quantity of words cannot exceed a predetermined threshold, or the like. Specific methods of filtering out the illegal content are mainly described below with respect to the illegal word list and the illegal sentence list respectively.

An illegal word is a preset word that is to be skipped as long as the word appears in blockchain data. The illegal word list is a list including illegal words. An illegal sentence is a preset sentence that is to be skipped as long as the sentence appears in blockchain data. The illegal sentence list is a list including illegal sentences.

In an embodiment, no matter whether the filtering is implemented by the content security module or the blockchain browser, the filtering rule includes the illegal word list. Further, the filtering out the illegal content in the blockchain data according to the filtering rule can include performing word segmentation on each piece of transaction information in the blockchain data, and comparing each segmented word with an illegal word in the illegal word list one by one, and filtering out, in a case that one of segmented words matches the illegal word in the illegal word list, illegal content including the segmented word.

The decoded blockchain data is often represented as a series of characters, for example, "Name of invoicing unit: Beijing Lesheng company . . . " in FIG. 2c. Word segmentation may be performed on the characters by using a current common word segmentation method. Each segmented word is compared with the illegal word in the illegal word list one by one. For example, the comparison is started from the first illegal word to the last illegal word. If one of the segmented words is consistent with the illegal word in the illegal word list, the word consistent with the illegal word is filtered out.

In another embodiment, no matter whether the filtering is implemented by the content security module or the blockchain browser, the filtering rule includes the illegal word list, and the filtering out the illegal content in the blockchain data according to the filtering rule can include performing word segmentation on each piece of transaction information in the blockchain data, searching a synonym table, to determine a synonym of each segmented word, and determining, for each segmented word, whether at least one of synonyms of the word matches an illegal word in the illegal word list, and filtering out illegal content including the segmented word in a case that a synonym of the word matches the illegal word in the illegal word list.

In this embodiment, the synonym table is also provided. In the synonym table, synonyms are stored in groups, and words in each group have the same meaning. After the word segmentation on the transaction information, the synonym table is searched, to find all words in the same group as the segmented word in the synonym table as synonyms (including the word) of the word. Then, it is determined, for each word in the group of synonyms, whether an illegal word in the illegal word list is consistent with the word. The subsequent determination is no longer performed if an illegal word is consistent with the word, and the segmented word is directly filtered out as illegal content.

This embodiment has the following beneficial effect: not only an illegal word is filtered out, but also a word of which a synonym is an illegal word is filtered out. Impact of expressing the same meaning in a language in different expression manners is fully considered, to improve the accuracy of illegal content filtering.

In an embodiment, the illegal content including the illegal word includes any one of the following: the illegal word; a sentence where the illegal word is located; a section where the illegal word is located; and transaction information where the illegal word is located.

That is, the illegal content including the illegal word may be filtered out in different manners. If only the illegal word is filtered out, the word may still be inferred from the context of the illegal word, or the context of the illegal word is also unpleasing to a user. Therefore, if the illegal word is severely illegal, it is to be considered that not only the illegal word is removed, but also a sentence where the illegal word is located, even a section where the illegal word is located, or even transaction information where the illegal word is located is removed.

The sentence herein may be a part between two adjacent punctuation marks. For example, a part between two adjacent commas or between a comma and a full stop that are adjacent is counted as a sentence. Alternatively, the sentence herein may be only a part between two adjacent full stops. As shown in FIG. 2c, in "purchased the products XXXXX of Lesheng company", only an illegal word is filtered out. If the sentence where the illegal word is located is to be filtered out, all words of "purchased the products XXXXX of Lesheng company" are filtered out.

The section herein is a paragraph in language. As shown in FIG. 2c, "Note: Dafa company purchased the products XXXXX from Lesheng company because of the XXXXX requirement, to for which is hereby noted" is a section.

The transaction information is information generated by a transaction recorded in a data block. For example, during transaction information chaining, transaction information is encapsulated and chained after meeting a pre-determined encapsulation rule instead of being chained once one piece of transaction information is generated. Therefore, a data block may include a plurality of pieces of transaction information. FIG. 2c shows transaction information of an invoicing transaction.

In an embodiment, the illegal word list further includes a filtering level corresponding to the illegal word. The illegal content including the illegal word may be determined based on the filtering level. For example, there are four filtering levels. The fourth level is the highest. If an illegal word in the illegal word list corresponds to the fourth level, transaction information where the illegal word is located needs to be filtered out. If an illegal word in the illegal word list corresponds to the third level, only a section where the illegal word is located may need to be filtered out. If an illegal word in the illegal word list corresponds to the second level, a sentence where the illegal word is located needs to be filtered out. If an illegal word in the illegal word list corresponds to the first level, the illegal word needs to be filtered out This embodiment has beneficial effects, for example, different illegal words at different impact levels are filtered out in different manners. Not only illegal words having great impact can be filtered out, but also unhealthy impact of the illegal words on users can be eliminated. In addition, the illegal words are filtered out more flexibly.

Figure 8:
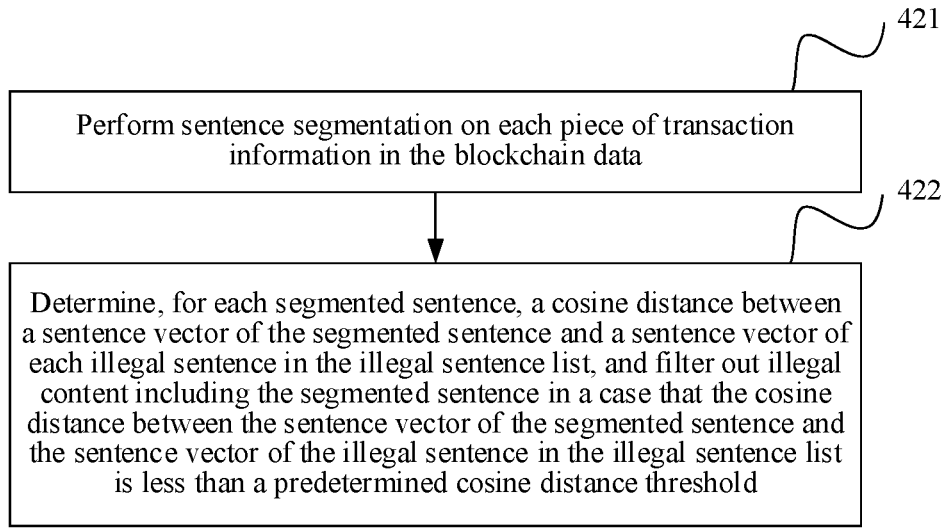
FIG. 8 is a specific flowchart of filtering out illegal content in blockchain data according to a filtering rule according to an embodiment of this disclosure.

In an embodiment, no matter whether the filtering is implemented by the content security module or the blockchain browser, the filtering rule includes an illegal sentence list. As shown in FIG. 8, the filtering out the illegal content in the blockchain data according to the filtering rule includes the following steps.

In Step 421, the process can include performing sentence segmentation on each piece of transaction information in the blockchain data.

In Step 422, the process can determine, for each segmented sentence, a cosine distance between a sentence vector of the segmented sentence and a sentence vector of each illegal sentence in the illegal sentence list, and filter out illegal content including the segmented sentence in a case that the cosine distance between the sentence vector of the segmented sentence and the sentence vector of the illegal sentence in the illegal sentence list is less than a predetermined cosine distance threshold.

In Step 421, the sentence segmentation is performed on each piece of transaction information in the blockchain data in the foregoing manner. A part between two adjacent punctuation marks may be used as a sentence, or a part between two adjacent full stops may be used as a sentence. Therefore, details are not described again.

In Step 422, each segmented sentence has a sentence vector. The sentence vector represents a vector of a sentence. Because a cosine distance may be obtained only when vectors have the same dimension, herein, it is required to ensure that sentence vectors of all sentences have the same dimension. For example, the sentence vector of each segmented sentence is 1000-dimensional, and the sentence vector of each illegal sentence in the illegal sentence list is also 1000-dimensional. A method for constructing a sentence vector is described below. The sentence vector is characterized in that meanings of two sentences being closer indicates a smaller cosine distance between sentence vectors of the two sentences. Therefore, the cosine distance between the sentence vectors of the two sentences may be compared with the predetermined cosine distance threshold. If the cosine distance is less than the predetermined cosine distance threshold, the two sentences are considered to have the same meaning. Therefore, if a cosine distance between the sentence vector of the segmented sentence and a sentence vector of any illegal sentence in the illegal sentence list is less than the predetermined cosine distance threshold, illegal content including the segmented sentence is filtered out.

This embodiment has beneficial effect. For example, the sentences are vectorized, and the cosine distance between the sentence vectors is compared with the predetermined cosine distance threshold to determine whether meanings of the sentences are close. In this manner, a sentence of which the meaning is relatively close to the meaning of an illegal sentence in the illegal sentence list is filtered out with a relatively low processing overhead.

Figure 9:
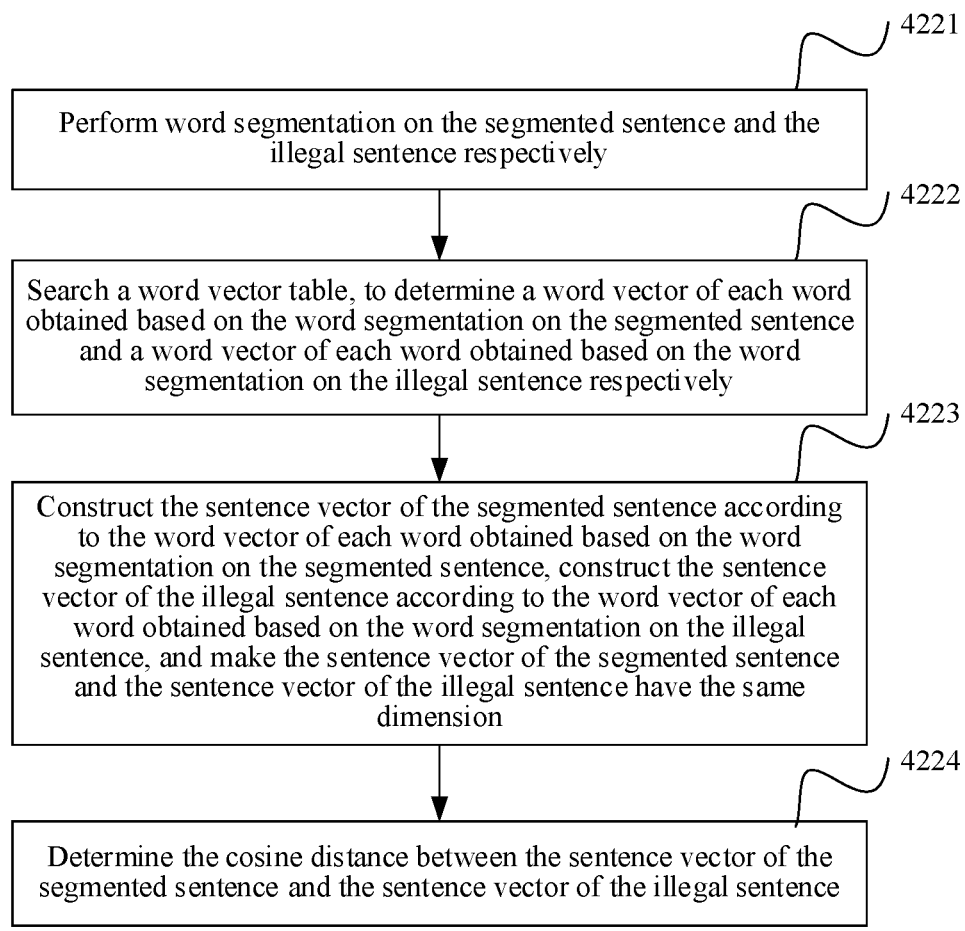
FIG. 9 is a specific flowchart of determining a cosine distance between a sentence vector of a segmented sentence and a sentence vector of each illegal sentence in an illegal sentence list according to an embodiment of this disclosure.

In an embodiment, as shown in FIG. 9, the determining a cosine distance between a sentence vector of the segmented sentence and a sentence vector of each illegal sentence in the illegal sentence list includes the following steps.

In Step 4221, the process can include performing word segmentation on the segmented sentence and the illegal sentence respectively.

In Step 4222, the process can include searching a word vector table, to determine a word vector of each word obtained based on the word segmentation on the segmented sentence and a word vector of each word obtained based on the word segmentation on the illegal sentence respectively.

In Step 4223, the process can construct the sentence vector of the segmented sentence according to the word vector of each word obtained based on the word segmentation on the segmented sentence, construct the sentence vector of the illegal sentence according to the word vector of each word obtained based on the word segmentation on the illegal sentence, and make the sentence vector of the segmented sentence and the sentence vector of the illegal sentence have the same dimension.

In Step 4224, the process can determine the cosine distance between the sentence vector of the segmented sentence and the sentence vector of the illegal sentence.

The word vector is a vector used for representing a word. Meanings of words being closer indicates a smaller cosine distance between vectors. A word vector is multi-dimensional. For example, each word is represented by a 100-dimensional vector, that is, (a1, a2, a3, . . . , a99, a100). Alternatively, the vector includes 100 elements. Because word vectors of all words have the same dimension, a cosine distance between word vectors of any two words can be calculated.

The word vector table is a table for storing a correspondence between each word and a vector of the word. The word vector of each word obtained based on the word segmentation on the segmented sentence and the word vector of each word obtained based on the word segmentation on the illegal sentence may be found by searching the word vector table. However, the segmented sentence and the illegal sentence have different quantities of words, and after the word vectors of the sentences are concatenated according to the order of the words, dimensions of the sentences are different. Therefore, in step 4223, the dimensions need to be processed to be the same. A specific processing method is described below in detail. After the dimensions are processed to be the same, in step 4224, the cosine distance between the sentence vector of the segmented sentence and the sentence vector of the illegal sentence may be determined.

Figure 10:
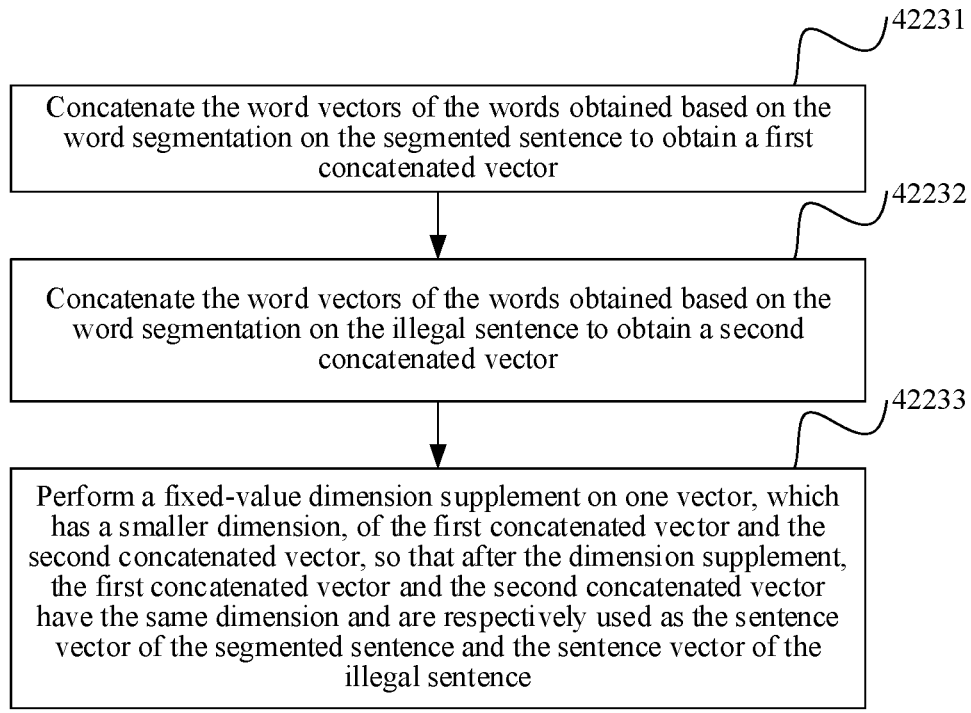
FIG. 10 is a specific flowchart of step 4223 according to an embodiment of this disclosure.

In an embodiment, as shown in FIG. 10, step 4223 includes the following steps.

In Step 42231, the process can further include concatenating the word vectors of the words obtained based on the word segmentation on the segmented sentence to obtain a first concatenated vector.

In Step 42232, the process can concatenate the word vectors of the words obtained based on the word segmentation on the illegal sentence to obtain a second concatenated vector.

In Step 42233, the process performs a fixed-value dimension supplement on one vector, which has a smaller dimension, of the first concatenated vector and the second concatenated vector, so that after the dimension supplement, the first concatenated vector and the second concatenated vector have the same dimension and are respectively used as the sentence vector of the segmented sentence and the sentence vector of the illegal sentence.

The concatenation means that the word vectors of the words are connected according to the order in which the words appear in the sentence. For example, the segmented sentence is "issue an invoice within one week", which is segmented into four words, namely, "one week", "within", "issue", and "an invoice". Each word corresponds to a 100-dimensional word vector. A 400-dimensional vector, that is, the first concatenated vector, is formed after the four 100-dimensional word vectors are connected, where a word vector of "an invoice" follows a word vector of "issue", a word vector of "within" follows the word vector of "an invoice", and a word vector of "one week" follows the word vector of "within". The illegal sentence is "please falsely issue an invoice", which is segmented into three words, namely, "please", "falsely issue" and "an invoice", which are connected to form a 300-dimensional vector, that is, the second concatenated vector. In this case, a dimension supplement needs to be performed. For example, a 100-dimensional "0" element is added to the end of the 300-dimensional vector to form a 400-dimensional vector. In this way, after the dimension supplement, the first concatenated vector and the second concatenated vector have the same dimension, that is, both are 400-dimensional, and are respectively used as the sentence vector of the segmented sentence and the sentence vector of the illegal sentence.

This embodiment has the following beneficial effect: An equal-dimensional expansion is realized in a simple and feasible solution through the fixed-value dimension supplement, so that a sentence of which the meaning is close to the meaning of the illegal sentence can be filtered out with a relatively low processing overhead.

Figure 11:
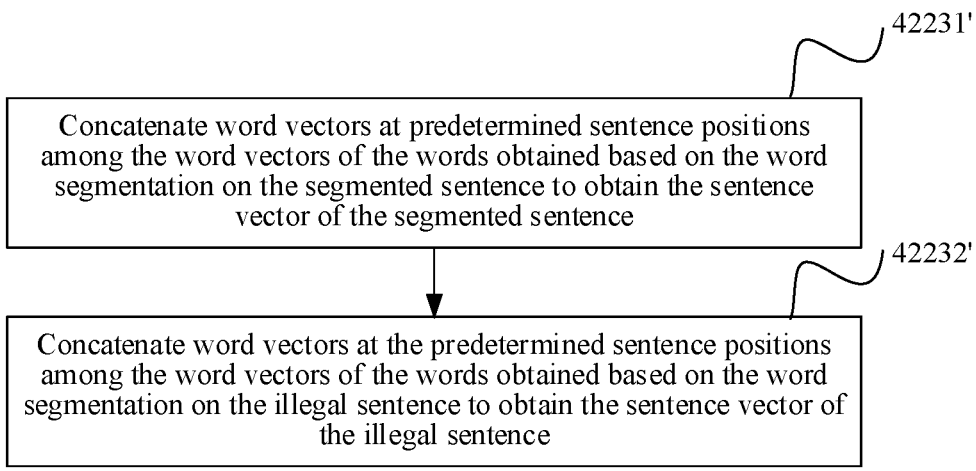
FIG. 11 is a specific flowchart of step 4223 according to an embodiment of this disclosure.

In another embodiment, as shown in FIG. 11, step 4223 includes the following steps.

In Step 42231', the process can concatenate word vectors at predetermined sentence positions among the word vectors of the words obtained based on the word segmentation on the segmented sentence to obtain the sentence vector of the segmented sentence.

Step 42232', the process can concatenate word vectors at the predetermined sentence positions among the word vectors of the words obtained based on the word segmentation on the illegal sentence to obtain the sentence vector of the illegal sentence.

The predetermined sentence position herein may be a position of a grammatical component, for example, a position of a predicate or a position of a head word of an object, or may be a position of a word order, for example, a position of the first word or a position of the last word. Because the predetermined sentence positions are fixed, a quantity of found words is fixed, and sentence vectors having the same dimension can be obtained by concatenating the word vectors.

For example, the segmented sentence is "issue an invoice", the predicate is "issue", and the object is "an invoice". The illegal sentence is "please falsely issue an invoice", the predicate is "falsely issue", and the object is "an invoice". A word vector of "issue" and a word vector of "an invoice" are connected to obtain the sentence vector of the segmented sentence. A word vector of "falsely issue" and a word vector of "an invoice" are connected to obtain the sentence vector of the illegal sentence.

This embodiment has the following beneficial effect: Because the words at the predetermined sentence position have similar functions in the sentences, the word vectors are also at the similar position in the sentence vectors, so that the sentence vectors are properly compared, to improve the accuracy of filtering.

Figure 12:
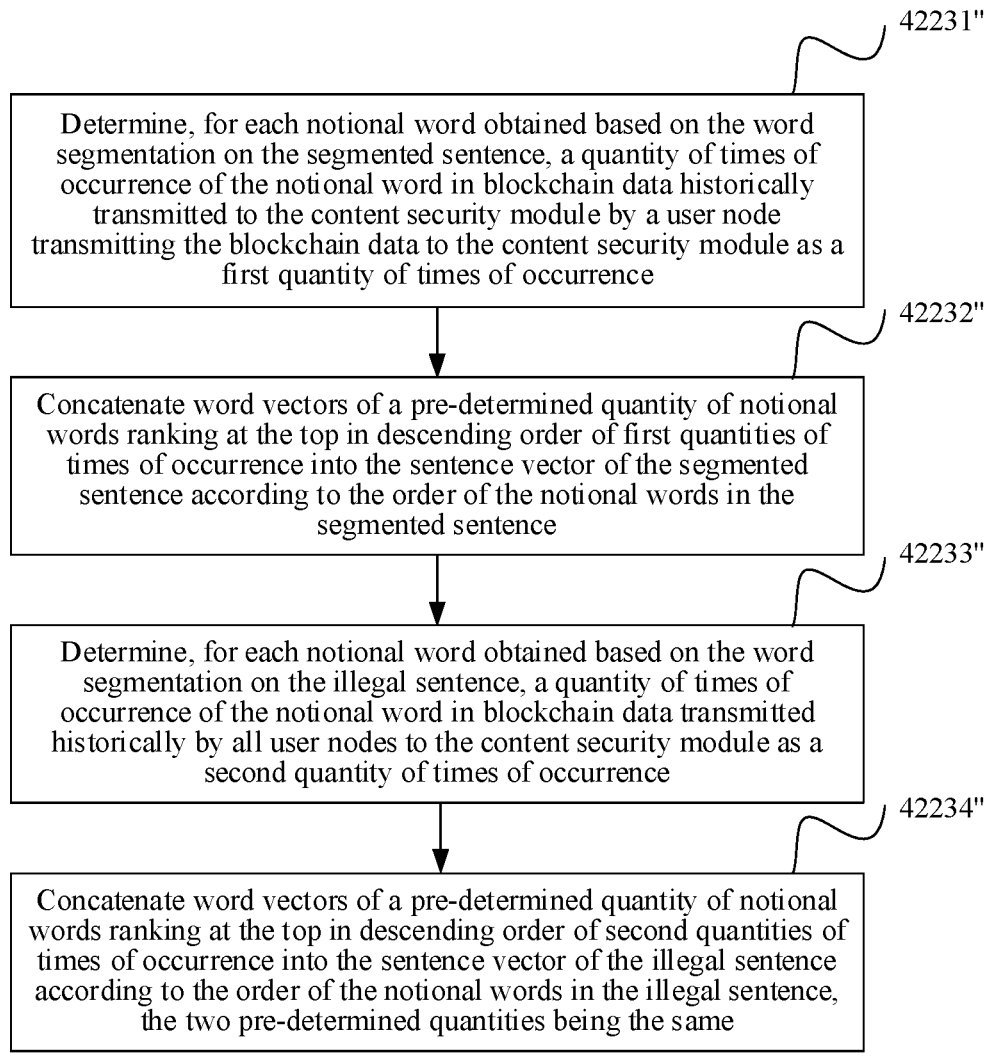
FIG. 12 is a specific flowchart of step 4223 according to an embodiment of this disclosure.

In another embodiment, as shown in FIG. 12, step 4223 includes the following steps:

In Step 42231", the process can determine, for each notional word obtained based on the word segmentation on the segmented sentence, a quantity of times of occurrence of the notional word in blockchain data historically transmitted to the content security module by a user node transmitting the blockchain data to the content security module as a first quantity of times of occurrence.

In Step 42232", the process can concatenate word vectors of a pre-determined quantity of notional words ranking at the top in descending order of first quantities of times of occurrence into the sentence vector of the segmented sentence according to the order of the notional words in the segmented sentence.

In Step 42233", the process can determine, for each notional word obtained based on the word segmentation on the illegal sentence, a quantity of times of occurrence of the notional word in blockchain data transmitted historically by all user nodes to the content security module as a second quantity of times of occurrence.

In Step 42234", the process can concatenate word vectors of a pre-determined quantity of notional words ranking at the top in descending order of second quantities of times of occurrence into the sentence vector of the illegal sentence according to the order of the notional words in the illegal sentence, the two pre-determined quantities being the same.

In this embodiment, a word is selected according to the frequency of occurrence of the word in chained data instead of a position of the word in a sentence. More frequent occurrence of notional words in the chained data indicates that it is more important to chain the notional words, and it is more necessary to extract word vectors of the notional words to construct a sentence vector, so that the sentence vector can truly reflect a significant feature in the sentence, and the filtering can be more accurate by using such a constructed sentence vector. There are large quantities of times of occurrence of function words such as "of" in most contexts. It is unnecessary to consider word vectors of the function words. Therefore, in this embodiment, the function words are first removed. Notional words and function words may be identified by using an existing part-of-speech tagging technology.

Blockchain data historically transmitted by each user node to the content security module may be stored in the content security module. In this way, for each notional word obtained based on the word segmentation on the segmented sentence, a quantity of times of occurrence of the notional word in the blockchain data historically transmitted by the user node may be found as the first quantity of times of occurrence. A larger first quantity of times of occurrence indicates higher importance of the notional word to the user node. The notional words obtained based on the word segmentation on the segmented sentence may be sorted in descending order according to the first quantities of times of occurrence. Word vectors of a pre-determined quantity of notional words ranking at the top, for example the top three, in the sorting are concatenated according to the order of the notional words in the segmented sentence to obtain the sentence vector of the segmented sentence.

Similarly, for each notional word obtained based on the word segmentation on the illegal sentence, a quantity of times of occurrence of the notional word in blockchain data transmitted historically by all user nodes to the content security module may also be determined as a second quantity of times of occurrence. The notional words in the illegal sentence may also be sorted in descending order according to the second quantities of times of occurrence. Word vectors of a pre-determined quantity of notional words ranking at the top, for example the top three, in the sorting are concatenated according to the order of the notional words in the illegal sentence to obtain the sentence vector of the illegal sentence.

Because the predetermined quantity is fixed, the sentence vector of the segmented sentence and the sentence vector of the illegal sentence have the same dimension. This embodiment has the following beneficial effect: Because the sentence vector is selected according to the quantity of times of occurrence of the notional word in the sentence, and the quantity of times of occurrence represents the importance of the notional word, the accuracy and quality of the filtering are improved.

In an embodiment, the illegal content including the segmented sentence includes any one of the following: the illegal sentence; a section where the illegal sentence is located; and transaction information where the illegal sentenced is located.

In an embodiment, the illegal sentence list may further include a filtering level corresponding to the illegal sentence. The illegal content including the illegal sentence may be determined based on the filtering level, which is similar to the case that the illegal word list includes the filtering level corresponding to the illegal word. Therefore, details are not described again This embodiment has the following beneficial effect: The flexibility of illegal content filtering is improved, and different levels of filtering are implemented for illegal content with different severity degrees.

In addition, when a supervision department learns that a piece of transaction information or a data block is illegal, more specific filtering may be implemented. That is, the transaction information or the data block may be directly filtered.

In an embodiment, no matter whether the filtering is implemented by the content security module or the blockchain browser, the filtering rule includes at least one of an illegal data block identifier and an illegal transaction information identifier, and the filtering out the illegal content in the blockchain data according to the filtering rule can include filtering out a data block where the illegal data block identifier is located in a case that the blockchain data obtained through query includes the illegal data block identifier, and filtering out transaction information where the illegal transaction information identifier is located in a case that the blockchain data obtained through query includes the illegal transaction information identifier.

The data block identifier may be a digest or a height of the data block. The digest or the height may be in a block header of the data block. In this way, the identifier in the block header of the data block obtained through query is compared with all pre-stored illegal transaction information identifiers one by one. If the identifier in the block header is consistent with a pre-stored illegal transaction information identifier, the data block is filtered out.

The transaction information identifier may be a digest of the transaction information, and may be stored in a one-to-one correspondence with the transaction information in the data block. A transaction information digest corresponding to transaction information in the data block obtained through query is compared with all pre-stored illegal transaction information identifiers one by one. If the corresponding transaction information digest is consistent with a pre-stored illegal transaction information identifier, the transaction information is filtered out.

In this embodiment, a specific data block or specific transaction information may be specifically filtered out.

In step 340, the filtered blockchain data is displayed.

Figure 13:
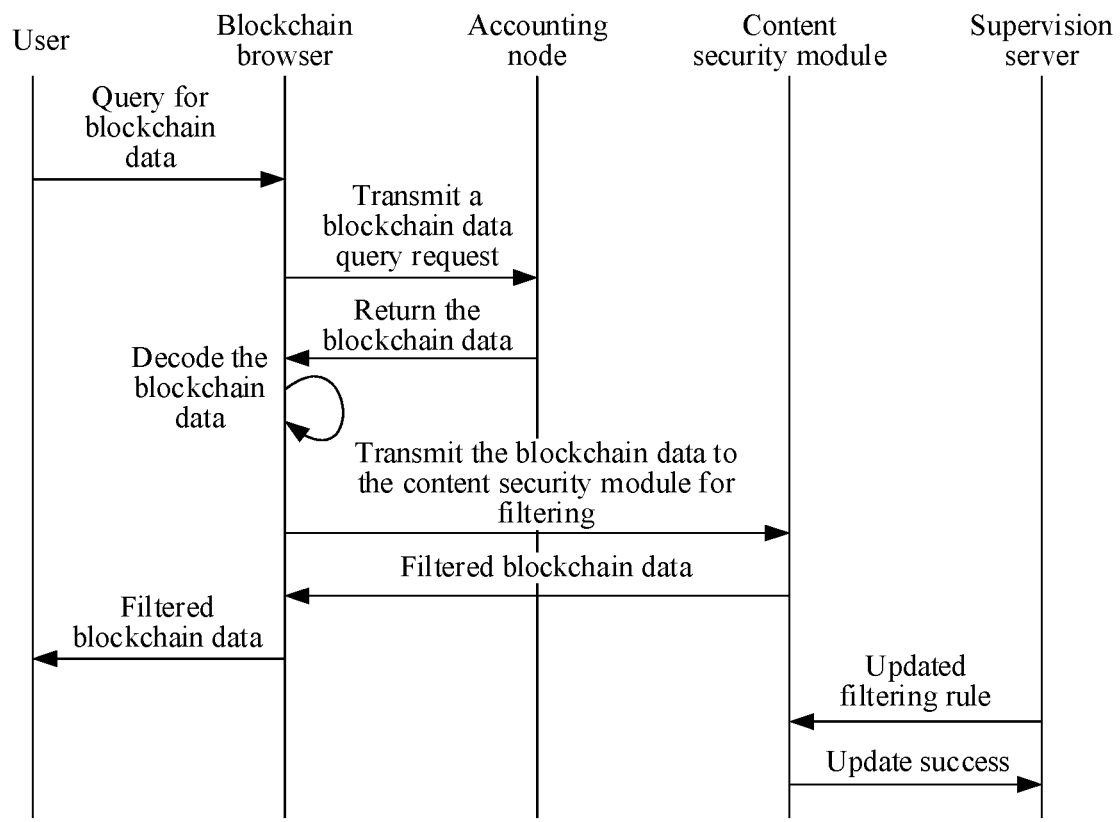
FIG. 13 is an interaction flowchart of an overall implementation process according to an embodiment of this disclosure.

FIG. 13 is an interaction flowchart of an overall implementation process according to an embodiment of this disclosure. A user enters an identifier of to-be-queried-for blockchain data on a blockchain browser. The blockchain browser transmits a blockchain data query request to an accounting node. The blockchain data query request has the identifier of the blockchain data. The accounting node searches the blockchain for encoded blockchain data according to the identifier, and returns the encoded blockchain data to the blockchain browser. The blockchain browser decodes the encoded blockchain data and transmits the decoded blockchain data to a content security module for filtering. The content security module filters out illegal content from the decoded blockchain data according to a filtering rule to generate filtered blockchain data, and returns the filtered blockchain data to the blockchain browser. The blockchain browser displays the filtered blockchain data to the user. A supervision server may update the filtering rule in the content security module. The content security module notifies the supervision server after the update is successful.

Figure 14:
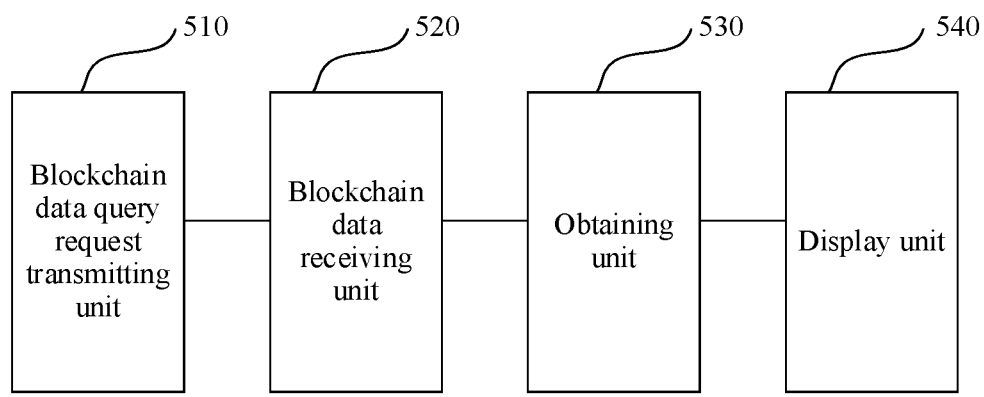
FIG. 14 is a structural diagram of a blockchain browser according to an embodiment of this disclosure.

As shown in FIG. 14, according to an embodiment of this disclosure, a blockchain browser is further provided and can include a blockchain data query request transmitting unit 510, configured to transmit a blockchain data query request, and a blockchain data receiving unit 520, configured to receive blockchain data obtained through query in response to the blockchain data query request. The blockchain browser can further include an obtaining unit 530, configured to obtain filtered blockchain data, the filtered blockchain data being generated after illegal content in the blockchain data is filtered out according to a filtering rule, and a display unit 540, configured to display the filtered blockchain data.

In an embodiment, the obtaining unit 530 is configured to transmit the blockchain data to a content security module, so that the content security module filters out the illegal content in the blockchain data according to the filtering rule, to generate the filtered blockchain data; and receive the filtered blockchain data transmitted by the content security module. In an embodiment, the obtaining unit 530 is configured to transmit the blockchain data together with a user node type to the content security module. The filtering out the illegal content in the blockchain data according to the filtering rule and further include searching a pre-stored table of a correspondence between a user node type and a filtering rule according to the user node type, to obtain a filtering rule corresponding to the user node type, and filtering out the illegal content in the blockchain data according to the filtering rule corresponding to the user node type.

In an embodiment, the blockchain includes a plurality of sub-blockchains. Each sub-blockchain has a sub-blockchain identifier. The obtaining unit 530 is configured to transmit the blockchain data together with a sub-blockchain identifier of a sub-blockchain where the blockchain data is located to the content security module. The filtering out the illegal content in the blockchain data according to the filtering rule include searching a pre-stored table of a correspondence between a sub-blockchain identifier and a filtering rule according to the sub-blockchain identifier, to obtain a filtering rule corresponding to the sub-blockchain identifier, and filtering out the illegal content in the blockchain data according to the filtering rule corresponding to the sub-blockchain identifier.

In an embodiment, the blockchain data receiving unit 520 is configured to receive encoded blockchain data obtained through query in response to the blockchain data query request.

The blockchain browser further includes: a decoding unit, configured to decode the encoded blockchain data before the blockchain data is transmitted to the content security module.

In an embodiment, the filtering rule includes an illegal word list, and the filtering out the illegal content in the blockchain data according to the filtering rule can include performing word segmentation on each piece of transaction information in the blockchain data, and comparing each segmented word with an illegal word in the illegal word list one by one, and filtering out, in a case that one of segmented words matches the illegal word in the illegal word list, illegal content including the segmented word.

In an embodiment, the filtering rule includes an illegal word list, and the filtering out the illegal content in the blockchain data according to the filtering rule can include performing word segmentation on each piece of transaction information in the blockchain data, and searching a synonym table, to determine a synonym of each segmented word. The method can further include determining, for each segmented word, whether at least one of synonyms of the word matches an illegal word in the illegal word list, and filtering out illegal content including the segmented word in a case that a synonym of the word matches the illegal word in the illegal word list.

In an embodiment, the illegal content including the segmented word includes any one of the following: the illegal word; a sentence where the illegal word is located; a section where the illegal word is located; transaction information where the illegal word is located; and content determined according to a filtering level corresponding to the illegal word, the illegal word list further including the filtering level corresponding to the illegal word.

In an embodiment, the filtering rule includes an illegal sentence list, and the filtering out the illegal content in the blockchain data according to the filtering rule can include performing sentence segmentation on each piece of transaction information in the blockchain data, and determining, for each segmented sentence, a cosine distance between a sentence vector of the segmented sentence and a sentence vector of each illegal sentence in the illegal sentence list, and filtering out illegal content including the segmented sentence in a case that the cosine distance between the sentence vector of the segmented sentence and the sentence vector of the illegal sentence in the illegal sentence list is less than a predetermined cosine distance threshold.

In an embodiment, the determining a cosine distance between a sentence vector of the segmented sentence and a sentence vector of each illegal sentence in the illegal sentence list include performing word segmentation on the segmented sentence and the illegal sentence respectively, and searching a word vector table, to determine a word vector of each word obtained based on the word segmentation on the segmented sentence and a word vector of each word obtained based on the word segmentation on the illegal sentence respectively. The method can further include constructing the sentence vector of the segmented sentence according to the word vector of each word obtained based on the word segmentation on the segmented sentence, constructing the sentence vector of the illegal sentence according to the word vector of each word obtained based on the word segmentation on the illegal sentence, and making the sentence vector of the segmented sentence and the sentence vector of the illegal sentence have the same dimension, and determining the cosine distance between the sentence vector of the segmented sentence and the sentence vector of the illegal sentence.

In an embodiment, the constructing the sentence vector of the segmented sentence according to the word vector of each word obtained based on the word segmentation on the segmented sentence, constructing the sentence vector of the illegal sentence according to the word vector of each word obtained based on the word segmentation on the illegal sentence, and making the sentence vector of the segmented sentence and the sentence vector of the illegal sentence have the same dimension includes determining, for each notional word obtained based on the word segmentation on the segmented sentence, a quantity of times of occurrence of the notional word in blockchain data historically transmitted to the content security module by a user node transmitting the blockchain data to the content security module as a first quantity of times of occurrence. The method can further include concatenating word vectors of a pre-determined quantity of notional words ranking at the top in descending order of first quantities of times of occurrence into the sentence vector of the segmented sentence according to the order of the notional words in the segmented sentence, determining, for each notional word obtained based on the word segmentation on the illegal sentence, a quantity of times of occurrence of the notional word in blockchain data transmitted historically by all user nodes to the content security module as a second quantity of times of occurrence, and concatenating word vectors of a pre-determined quantity of notional words ranking at the top in descending order of second quantities of times of occurrence into the sentence vector of the illegal sentence according to the order of the notional words in the illegal sentence, the two pre-determined quantities being the same.

In an embodiment, the filtering rule includes at least one of an illegal data block identifier and an illegal transaction information identifier.

The filtering out the illegal content in the blockchain data according to the filtering rule can include filtering out a data block where the illegal data block identifier is located in a case that the blockchain data transmitted to the content security module includes the illegal data block identifier, and filtering out transaction information where the illegal transaction information identifier is located in a case that the blockchain data transmitted to the content security module includes the illegal transaction information identifier.

Figure 15:
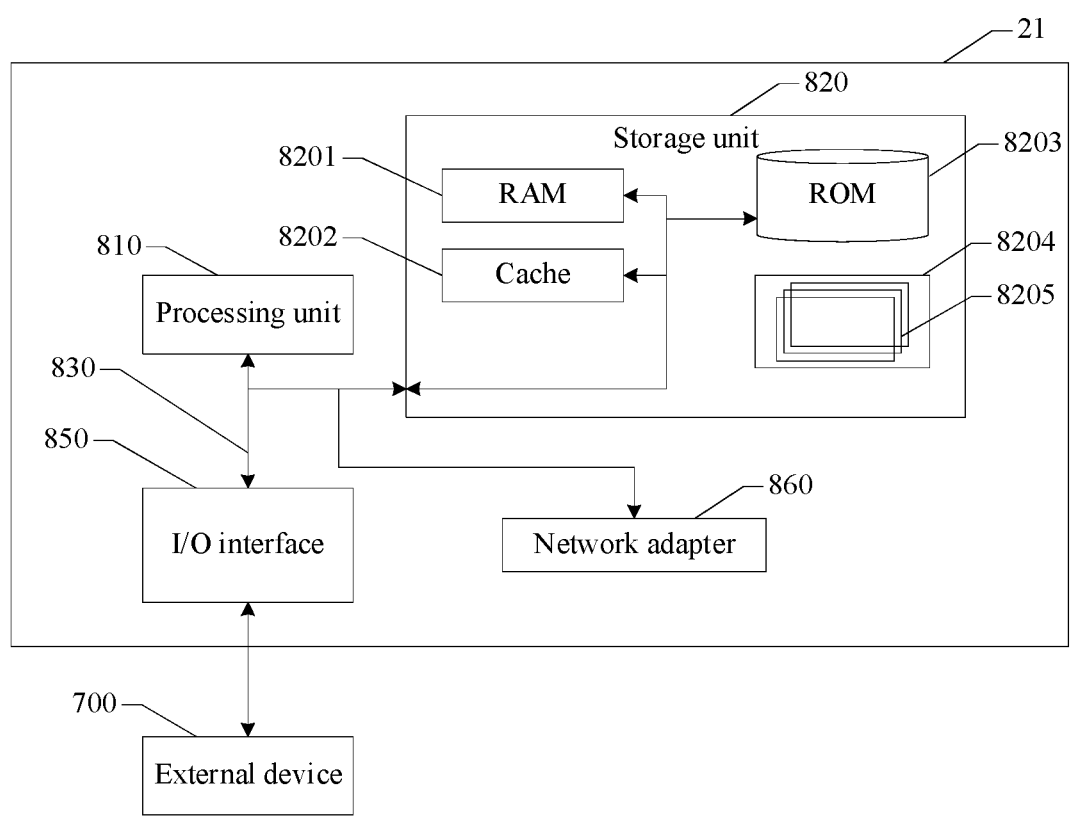
FIG. 15 is a hardware diagram of a user node to which a blockchain browser is applied according to an embodiment of this disclosure.

The method for displaying blockchain data obtained through query according to the embodiments of this disclosure may be performed by a user node 21 in FIG. 15. The user node 21 may be the accounting node 101 in FIG. 1a, the query node 104 in FIG. 1b, the query node 106 in FIG. 1c, or the like. The user node 21 according to the embodiments of this disclosure is described below with reference to FIG. 15. The user node 21 shown in FIG. 15 is only an example, and does not impose any limitation on the functions and scope of use of the embodiments of this disclosure.

As shown in FIG. 15, the user node 21 is represented in a form of a general-purpose computing device. Components of the user node 21 may include, but are not limited to: at least one processing unit 810, at least one storage unit 820, and a bus 830 connected to different system components (including the storage unit 820 and the processing unit 810).

The storage unit stores program code, and the program code may be executed by the processing unit 810, so that the processing unit 810 performs the steps according to various exemplary implementations of this disclosure described in the descriptions of the foregoing exemplary methods of the specification. For example, the processing unit 810 may perform the steps shown in FIG. 4.

The storage unit 820 may include a readable medium in the form of a volatile storage unit, for example, a random access memory (RAM) 8201 and/or a cache storage unit 8202, and may further include a read-only memory (ROM) 8203.

The storage unit 820 may further include a program/utility tool 8204 having a group of (at least one) program modules 8205. Such a program module 8205 includes, but is not limited to, an operating system, one or more application programs, other program modules, and program data. Each or a combination of these examples may include implementation of a network environment.

The bus 830 may represent one or more of several types of bus structures, including a storage unit bus or storage unit controller, a peripheral bus, an accelerated graphics port, a processing unit, or a local bus using any one of a plurality of bus structures.

The user node 21 may communicate with one or more external devices 700 (for example, a keyboard, a pointing device, and a Bluetooth device), or may communicate with one or more devices that enable a user to interact with the user node 21 and/or communicate with any device (for example, a router or a modem) that enables the user node 21 to communicate with one or more other computing devices. Such communication may be performed by using an input/output (I/O) interface 650. In addition, the user node 21 may further communicate with one or more networks (for example, a local area network (LAN), a wide area network (WAN), and/or a public network such as the Internet) by using a network adapter 860. As shown in the figure, the network adapter 860 communicates with other modules of the user node 21 by using the bus 830. It is to be understood that although not shown in the figure, other hardware and/or software modules may be used in combination with the user node 21, including, but not limited to, microcode, a device drive, a redundancy processing unit, an external disk drive array, a RAID system, a tape drive, a data backup and storage system, and the like.

Through descriptions of the foregoing implementations, it is easy for a person skilled in the art to understand that the exemplary implementations described herein can be implemented by software or by combining software with necessary hardware. Therefore, the technical solutions of the implementations of this application may be implemented in the form of a software product. The software product may be stored in a non-volatile storage medium (which may be a compact disc read-only memory (CD-ROM), a USB flash drive, a removable hard disk, or the like) or in a network and includes several instructions for instructing a computer device (which may be a personal computer, a server, a terminal device, a network device, or the like) to perform the methods described in the implementations of this disclosure.

In an exemplary embodiment of this disclosure, a computer program medium is further provided, storing computer-readable instructions, the computer-readable instructions, when executed by a processor of a computer, causing the computer to perform the method described in the foregoing method embodiments.

According to an embodiment of this disclosure, a program product for performing the method in the foregoing method embodiments is further provided. The program product may use a portable CD-ROM and include program code, and may be run on a terminal device such as a personal computer. However, the program product in this disclosure is not limited thereto. In this specification, the readable storage medium may be any tangible medium including or storing a program, and the program may be used by or used in combination with an instruction execution system, an apparatus, or a device.

The program product may use any combination of one or more non-transitory readable media. The readable medium may be a readable signal medium or a readable storage medium. The readable storage medium may be, for example, but is not limited to, an electric, magnetic, optical, electromagnetic, infrared, or semi-conductive system, apparatus, or device, or any combination thereof. More specific examples (a non-exhaustive list) of the readable storage medium may include: an electrical connection having one or more wires, a portable disk, a hard disk, a RAM, a ROM, an erasable programmable ROM (EPROM or flash memory), an optical fiber, a portable CD-ROM, an optical storage device, a magnetic storage device, or any appropriate combination thereof.

The non-transitory computer-readable signal medium may include a data signal propagated in a baseband or as part of a carrier, and stores readable program code. The propagated data signal may be in a plurality of forms, including but not limited to, an electromagnetic signal, an optical signal, or any appropriate combination thereof. The readable signal medium may alternatively be any readable medium other than the readable storage medium. The readable medium may be configured to transmit, propagate, or transmit a program used by or used in combination with an instruction execution system, an apparatus, or a device.

The program code included in the readable medium may be transmitted by using any appropriate medium, including but not limited to, a wireless medium, a wired medium, an optical cable, radio frequency (RF) or the like, or any appropriate combination thereof.

The program code used for performing the operations of this disclosure may be written by using one or more programming languages or a combination thereof. The programming languages include an object-oriented programming language such as Java and C++, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. In a case involving a remote computing device, the remote computing device may be connected to a user computing device through any type of network including a LAN or a WAN, or may be connected to an external computing device, for example, through the Internet by using an Internet service provider.

Although several modules or units of a device for action execution are mentioned in the foregoing detailed descriptions, the division is not mandatory. Actually, according to the implementations of this disclosure, the features and functions of two or more modules or units described above may be specified in one module or unit. Conversely, features and functions of one module or unit described above may be further divided into a plurality of modules or units to be specified.

In addition, although the various steps of the method in this disclosure are described in a specific order in the accompanying drawings, this does not require or imply that the steps are bound to be performed in the specific order, or all the steps shown are bound to be performed to achieve the desired result. Additionally or alternatively, some steps may be omitted, a plurality of steps may be combined into one step for execution, and/or one step may be decomposed into a plurality of steps for execution, and the like.

Through descriptions of the foregoing implementations, it is easy for a person skilled in the art to understand that the exemplary implementations described herein can be implemented by software or by combining software with necessary hardware. Therefore, the technical solutions of the implementations of this disclosure may be implemented in a form of a software product. The software product may be stored in a non-volatile storage medium, which may be a CD-ROM, a USB flash drive, a removable hard disk, or the like, or on the network, including several instructions for instructing a computing device, which may be a personal computer, a server, a mobile terminal, a network device, or the like, to perform the methods according to the implementations of this disclosure.

Other embodiments of this disclosure are apparent to a person skilled in the art from consideration of the specification and practice of this disclosure here. This disclosure is intended to cover any variations, uses or adaptive changes of this disclosure. Such variations, uses or adaptive changes follow the general principles of this disclosure, and include well-known knowledge and conventional technical means in the art that are not disclosed in this disclosure. The specification and the embodiments are merely considered as examples, and the actual scope and the spirit of this disclosure are pointed out by the following claims.

What is claimed is:

1. A method for displaying blockchain data that is performed by a computing device, the method comprising:
    transmitting a blockchain data query request;
    receiving blockchain data obtained through query in response to the blockchain data query request;
    obtaining filtered blockchain data that is generated by filtering out content in the blockchain data according to a filtering rule, the filtering rule corresponding to a user node type of a user node; and
    displaying the filtered blockchain data on the user node.

2. The method according to claim 1, wherein the obtaining the filtered blockchain data further comprises:
    transmitting the blockchain data to a content security device, so that the content security device filters out the content in the blockchain data based on the filtering rule to generate the filtered blockchain data; and
    receiving the filtered blockchain data transmitted by the content security device.

3. The method according to claim 2, wherein:
    the transmitting the blockchain data to the content security device further comprises:
        transmitting the blockchain data together with the user node type to the content security device, and
    the filtering out the content in the blockchain data based on the filtering rule further comprises:
        searching a pre-stored table of a correspondence between user node types and filtering rules based on the user node type to obtain a filtering rule corresponding to the user node type; and
        filtering out the content in the blockchain data based on the filtering rule corresponding to the user node type.

4. The method according to claim 2, wherein:
    the blockchain includes a plurality of sub-blockchains, each sub-blockchain having a sub-blockchain identifier,
    the transmitting the blockchain data to a content security module further comprises:
        transmitting the blockchain data together with a sub-blockchain identifier of a sub-blockchain where the blockchain data is located to the content security device, and
    the filtering out the content in the blockchain data based on the filtering rule further comprises:
        searching a pre-stored table of a correspondence between sub-blockchain identifiers and filtering rules based on the sub-blockchain identifier to obtain a filtering rule corresponding to the sub-blockchain identifier; and
        filtering out the content in the blockchain data based on the filtering rule corresponding to the sub-blockchain identifier.

5. The method according to claim 2, wherein the receiving the blockchain data obtained through the query in response to the blockchain data query request comprises:
    receiving encoded blockchain data obtained through the query in response to the blockchain data query request; and
    the method further comprises decoding the encoded blockchain data before transmitting the blockchain data to the content security device.

6. The method according to claim 2, wherein the filtering rule includes a word list, and the filtering out the content in the blockchain data based on the filtering rule further comprises:
    performing word segmentation on each piece of transaction information in the blockchain data; and
    comparing each segmented word with an word in the word list, and filtering out content including a segmented word when the segmented word matches the word in the word list.

7. The method according to claim 2, wherein the filtering rule includes a word list, and the filtering out the content in the blockchain data according to the filtering rule further comprises:
    performing word segmentation on each piece of transaction information in the blockchain data;
    searching a synonym table to determine a synonym of each segmented word; and
    determining whether at least one of synonyms of a segmented word matches a word in the word list for each segmented word, and filtering out content including the segmented word in a case that a synonym of the segmented word matches the word in the illegal word list.

8. The method according to claim 6, wherein the content comprising the segmented word includes any one of:

the segmented word;
a sentence where the segmented word is located;
a section where the segmented word is located;
transaction information where the segmented word is located; and
content determined based on a filtering level corresponding to the segmented word, the word list further including the filtering level corresponding to the segmented word.

9. The method according to claim 2, wherein the filtering rule includes a sentence list, and the filtering out the content in the blockchain data based on the filtering rule further comprises:
performing sentence segmentation on each piece of transaction information in the blockchain data; and
determining a cosine distance between a sentence vector of a segmented sentence and a sentence vector of each sentence in the sentence list for each segmented sentence, and filtering out content including the segmented sentence when the cosine distance between the sentence vector of the segmented sentence and the sentence vector of the sentence in the sentence list is less than a predetermined cosine distance threshold.

10. The method according to claim 9, wherein the determining the cosine distance further comprises:
performing word segmentation on the segmented sentence and the sentence in the sentence list respectively;
searching a word vector table to determine a word vector of each word obtained based on the word segmentation on the segmented sentence and a word vector of each word obtained based on the word segmentation on the sentence in the sentence list, respectively;
constructing the sentence vector of the segmented sentence based on the word vector of each word obtained based on the word segmentation on the segmented sentence, constructing the sentence vector of the sentence in the sentence list according to the word vector of each word obtained based on the word segmentation on the sentence in the sentence list, and making the sentence vector of the segmented sentence and the sentence vector of the sentence in the sentence list have a same dimension; and
determining the cosine distance between the sentence vector of the segmented sentence and the sentence vector of the sentence in the sentence list.

11. The method according to claim 10, wherein the constructing the sentence vector of the segmented sentence further comprises:
determining a quantity of times of occurrence of a notional word in blockchain data historically transmitted to the content security device by a user node transmitting the blockchain data to the content security device as a first quantity of times of occurrence for each notional word obtained based on the word segmentation on the segmented sentence;
concatenating word vectors of a pre-determined quantity of notional words ranking at a top in descending order of first quantities of times of occurrence into the sentence vector of the segmented sentence based on the order of the notional words in the segmented sentence;
determining a quantity of times of occurrence of the notional word in blockchain data transmitted historically by all user nodes to the content security device as a second quantity of times of occurrence for each notional word obtained based on the word segmentation on the sentence in the sentence list; and
concatenating word vectors of a pre-determined quantity of notional words ranking at a top in descending order of second quantities of times of occurrence into the sentence vector of the sentence in the sentence list based on the order of the notional words in the sentence in the sentence list, the two pre-determined quantities being the same.

12. The method according to claim 2, wherein the filtering rule includes at least one of a data block identifier and a transaction information identifier, and the filtering out the content in the blockchain data based on the filtering rule further comprises:
filtering out a data block where the data block identifier is located when the blockchain data includes the data block identifier; and
filtering out transaction information where the transaction information identifier is located when the blockchain data includes the transaction information identifier.

13. A blockchain browser, comprising:
processing circuitry configured to
transmit a blockchain data query request;
receive blockchain data obtained through query in response to the blockchain data query request;
obtain filtered blockchain data, the filtered blockchain data being generated by filtering out content in the blockchain data according to a filtering rule, the filtering rule corresponding to a user node type of a user node; and
display the filtered blockchain data on the user node.

14. A user node having a memory that stores non-transitory computer-readable instructions and a processor that reads the computer-readable instructions stored in the memory and performs a method for displaying blockchain data comprising:
transmitting a blockchain data query request;
receiving blockchain data obtained through query in response to the blockchain data query request;
obtaining filtered blockchain data that is generated by filtering out content in the blockchain data according to a filtering rule, the filtering rule corresponding to a user node type of the user node; and
displaying the filtered blockchain data.

15. A non-transitory computer-readable storage medium that stores non-transitory computer-readable instructions that, when executed by a processor of a computer, cause the computer to perform the method according to claim 1.

16. The user node according to claim 14, wherein the obtaining the filtered blockchain data further comprises:
transmitting the blockchain data to a content security device, so that the content security device filters out the content in the blockchain data based on the filtering rule to generate the filtered blockchain data; and
receiving the filtered blockchain data transmitted by the content security device.

17. The user node according to claim 16, wherein:
the transmitting the blockchain data to the content security device further comprises:
transmitting the blockchain data together with the user node type to the content security device, and
the filtering out the content in the blockchain data based on the filtering rule further comprises:
searching a pre-stored table of a correspondence between user node types and filtering rules based on the user node type to obtain a filtering rule corresponding to the user node type; and
filtering out the content in the blockchain data based on the filtering rule corresponding to the user node type.

18. The user node according to claim 16, wherein:
the blockchain includes a plurality of sub-blockchains, each sub-blockchain having a sub-blockchain identifier,
the transmitting the blockchain data to a content security module further comprises:
- transmitting the blockchain data together with a sub-blockchain identifier of a sub-blockchain where the blockchain data is located to the content security device, and the filtering out the content in the blockchain data based on the filtering rule further comprises:
- searching a pre-stored table of a correspondence between sub-blockchain identifiers and filtering rules based on the sub-blockchain identifier to obtain a filtering rule corresponding to the sub-blockchain identifier; and
- filtering out the content in the blockchain data based on the filtering rule corresponding to the sub-blockchain identifier.

19. The user node according to claim 16, wherein the receiving the blockchain data obtained through the query in response to the blockchain data query request comprises:
- receiving encoded blockchain data obtained through the query in response to the blockchain data query request; and
- the method for displaying the blockchain data further comprises decoding the encoded blockchain data before transmitting the blockchain data to the content security device.

* * * * *